(12) United States Patent
Lee et al.

(10) Patent No.: US 10,459,493 B2
(45) Date of Patent: Oct. 29, 2019

(54) ELECTRONIC DEVICE INCLUDING PLURALITY OF HOUSINGS

(71) Applicant: Samsung Electronics Co., Ltd., Gyeonggi-do (KR)

(72) Inventors: Jun-Won Lee, Gyeonggi-do (KR); Jang-Woon Kim, Seoul (KR); Chung-Ha Kim, Seoul (KR); Jae-Ho Baik, Yongin-si (KR); Hyun-Keun Son, Seoul (KR); Seung-Ho Jang, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 16/004,725

(22) Filed: Jun. 11, 2018

(65) Prior Publication Data

US 2018/0356864 A1 Dec. 13, 2018

(30) Foreign Application Priority Data

Jun. 12, 2017 (KR) ........................ 10-2017-0073316

(51) Int. Cl.
*G06F 1/16* (2006.01)
*E05D 1/00* (2006.01)
*E05D 11/10* (2006.01)

(52) U.S. Cl.
CPC ............ *G06F 1/1681* (2013.01); *E05D 1/00* (2013.01); *E05D 11/105* (2013.01); *G06F 1/1616* (2013.01); *G06F 1/1649* (2013.01); *G06F 1/1679* (2013.01); *E05Y 2201/46* (2013.01);

(Continued)

(58) Field of Classification Search
CPC ...... G06F 1/1616; G06F 1/162; G06F 1/1632; G06F 1/1654; G06F 1/1679; G06F 1/1681

See application file for complete search history.

(56) References Cited

U.S. PATENT DOCUMENTS 6,252,767 B1 * 6/2001 Carlson ................. G06F 1/1616
                                                         292/148
6,870,732 B2 * 3/2005 Huang ................... G06F 1/1626
                                                         220/230

(Continued)

FOREIGN PATENT DOCUMENTS

| JP | H111252223 A | 9/1999 |
| KR | 10-2003-0095643 A | 12/2003 |
| KR | 10-2005-0115409 A | 12/2005 |

OTHER PUBLICATIONS

International Search Report dated Aug. 21, 2018.

*Primary Examiner* — Adrian S Wilson
(74) *Attorney, Agent, or Firm* — Cha & Reiter, LLC.

(57) ABSTRACT

An electronic device according to one embodiment may include: a first housing including a first side; a second housing including a second side facing the first side; at least one first magnetic member configured to be rotatably disposed inside the first housing and adjacent to the first side; and at least one second magnetic member configured to be rotatably disposed inside the second housing and adjacent to the second side, wherein the first housing and the second housing are rotatably coupled to each other by a magnetic force between the at least one first magnetic member and the at least one second magnetic member. Various other embodiments are also possible.

20 Claims, 24 Drawing Sheets

(52) U.S. Cl.
CPC ..... *E05Y 2600/13* (2013.01); *E05Y 2900/606* (2013.01)

(56) References Cited

U.S. PATENT DOCUMENTS

| | | | | |
|---|---|---|---|---|
| 6,929,291 | B2* | 8/2005 | Chen | E05C 19/16 |
| | | | | 292/251.5 |
| 7,280,348 | B2* | 10/2007 | Ghosh | G06F 1/1616 |
| | | | | 248/225.11 |
| 7,541,907 | B2* | 6/2009 | Wang | G06F 1/1632 |
| | | | | 335/214 |
| 8,143,983 | B1* | 3/2012 | Lauder | G06F 1/1626 |
| | | | | 24/303 |
| 8,705,229 | B2* | 4/2014 | Ashcraft | G06F 1/1679 |
| | | | | 312/223.1 |
| 8,988,876 | B2* | 3/2015 | Corbin | A45C 13/002 |
| | | | | 361/679.58 |
| 9,161,469 | B2* | 10/2015 | Han | H05K 7/00 |
| 9,213,373 | B2* | 12/2015 | Lin | G06F 1/1669 |
| 9,268,369 | B2* | 2/2016 | Hirai | G06F 1/1669 |
| 9,277,661 | B2* | 3/2016 | Andre | H05K 5/0221 |
| 9,338,265 | B2* | 5/2016 | Varela | H04B 1/3888 |
| 9,372,511 | B2* | 6/2016 | Yeh | G06F 1/1669 |
| 9,507,384 | B2* | 11/2016 | Liang | G06F 1/1656 |
| 9,625,951 | B2* | 4/2017 | Liang | G06F 1/1662 |
| 10,162,381 | B2* | 12/2018 | Hsu | G06F 1/1616 |
| 2002/0154099 | A1* | 10/2002 | Oh | G06F 1/1626 |
| | | | | 345/173 |
| 2004/0190239 | A1* | 9/2004 | Weng | G06F 1/1616 |
| | | | | 361/679.2 |
| 2004/0248628 | A1 | 12/2004 | Taninai | |
| 2007/0121303 | A1* | 5/2007 | Wang | H04M 1/0222 |
| | | | | 361/752 |
| 2007/0138806 | A1* | 6/2007 | Ligtenberg | E05C 19/16 |
| | | | | 292/251.5 |
| 2007/0182663 | A1* | 8/2007 | Biech | G06F 1/1618 |
| | | | | 345/1.1 |
| 2008/0129953 | A1* | 6/2008 | Blum | G02C 5/143 |
| | | | | 351/153 |
| 2008/0232061 | A1* | 9/2008 | Wang | G06F 1/1632 |
| | | | | 361/679.41 |
| 2008/0278269 | A1* | 11/2008 | Ramirez | E05C 19/16 |
| | | | | 335/205 |
| 2009/0052123 | A1* | 2/2009 | Takeya | G01D 5/145 |
| | | | | 361/679.27 |
| 2009/0091512 | A1* | 4/2009 | Jung | G06F 1/1601 |
| | | | | 345/1.1 |
| 2009/0103261 | A1* | 4/2009 | Shih | E05C 19/16 |
| | | | | 361/679.58 |
| 2010/0123663 | A1* | 5/2010 | Leung | G06F 1/1632 |
| | | | | 345/169 |
| 2010/0238620 | A1* | 9/2010 | Fish | G06F 1/1616 |
| | | | | 361/679.09 |
| 2010/0321877 | A1* | 12/2010 | Moser | G06F 1/1616 |
| | | | | 361/679.29 |
| 2013/0301206 | A1* | 11/2013 | Whitt, III | G06F 1/1618 |
| | | | | 361/679.28 |
| 2014/0011548 | A1* | 1/2014 | Varela | H04B 1/3888 |
| | | | | 455/566 |
| 2014/0169853 | A1* | 6/2014 | Sharma | G06F 3/0202 |
| | | | | 400/481 |
| 2015/0378399 | A1* | 12/2015 | Grinstead | G06F 1/1681 |
| | | | | 361/679.09 |
| 2017/0045912 | A1 | 2/2017 | Hsu et al. | |
| 2017/0125144 | A1 | 5/2017 | Lauder et al. | |
| 2018/0188780 | A1* | 7/2018 | Perelli | G06F 1/1679 |
| 2018/0209473 | A1* | 7/2018 | Park | F16C 11/04 |
| 2018/0335800 | A1* | 11/2018 | Kim | G06F 1/1618 |

* cited by examiner

ELECTRONIC DEVICE INCLUDING PLURALITY OF HOUSINGS

CROSS-REFERENCE TO RELATED APPLICATION

This application is based on and claims priority under 35 U.S.C. § 119 of Korean Patent Application No. 10-2017-0073316, filed on Jun. 12, 2017, in the Korean Intellectual Property Office, the disclosure of which is incorporated herein by reference in its entirety.

BACKGROUND

1. Field

Various embodiments of the present disclosure generally relate to an electronic device and, for example, to an electronic device including a plurality of housings.

2. Description of the Related Art

The term "electronic devices" used herein may refer to devices that perform specific functions based on various programs, such as home appliances, electronic organizers, portable multimedia players, mobile communication terminals, tablet PCs, video/audio devices, desktop/laptop computers, navigation systems, or the like. For example, these electronic devices can output stored information such as sounds or images. As more and more features are integrated in these electronic devices, and as high-speed and high-capacity wireless communications have become more common, these electronic devices recently have been able to perform more and more functions.

As their functions proliferate, it has become desirable for these electronic devices to adopt large displays. However, it is also desirable for the electronic devices to have small form factors. Accordingly, there is a trade-off relationship between display size and form factor.

SUMMARY

To address the above problem in the art, disclosed herein is an electronic device having a wider screen composed of two displays that are connected by a hinge. The electronic device may be unfolded so that an image may be displayed across both displays, thereby realizing a larger and wider screen. The configuration of the two displays, which can be folded, can improve the portability of the electronic device. However, having the hinge exposed on the exterior of the electronic device may degrade the aesthetic appearance of the electronic device.

One or more embodiments disclosed herein may provide an electronic device in which a plurality of displays can be folded or unfolded without using hinges that are exposed on the exterior of the electronic device.

One or more embodiments disclosed herein may provide an electronic device including a plurality of displays that can be articulated to have various angles therebetween.

An electronic device according to one embodiment may include: a first housing including a first side; a second housing including a second side facing the first side; at least one first magnetic member configured to be rotatably disposed inside the first housing and adjacent to the first side; and at least one second magnetic member configured to be rotatably disposed inside the second housing and adjacent to the second side, wherein the first housing and the second housing are rotatably coupled to each other by a magnetic force between at least one first magnetic member and at least one second magnetic member.

An electronic device, according to one embodiment may include: a first housing including a first side, a first surface, a second surface a first display and a first receptacle; a second housing including a second side, a third surface, a fourth surface a second display and a second receptacle; at least one first magnetic member configured to be rotatably received in the second receptacle; at least one second magnetic member configured to be rotatably received in the second receptacle, and configured to correspond to the first magnetic member; a plurality of first inclined surfaces formed on the first side; and a plurality of second inclined surfaces formed on the second side, wherein the first magnetic member and the second magnetic member rotate with respect to each other to generate a magnetic force therebetween when the second housing is rotated with respect to the first housing, and wherein one of the plurality of first inclined surfaces is maintained in contact with one of the plurality of second inclined surfaces by the magnetic force between the first and second magnetic members, thereby maintaining an angle between the first housing and the second housing.

An electronic device according to one embodiment may include: a first housing; a display disposed on a first surface of the first housing; at least one first magnetic member configured to be rotatably disposed inside the first housing and adjacent to a second surface of the first housing; and a first stopper configured to be disposed inside the first housing so as to restrict the rotation of the first magnetic member.

Since an electronic device according to various embodiments of the present disclosure includes first and second magnetic members that can generate a magnetic force, it is possible to rotatably couple a first housing and a second housing of the electronic device using the magnetic force such that hinge structures are not necessary, thereby realizing an aesthetic design of the electronic device. Further, the electronic device may include first and second stoppers for restricting the rotation of the first and second magnetic members. This way, the electronic device can be mounted at various angles.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
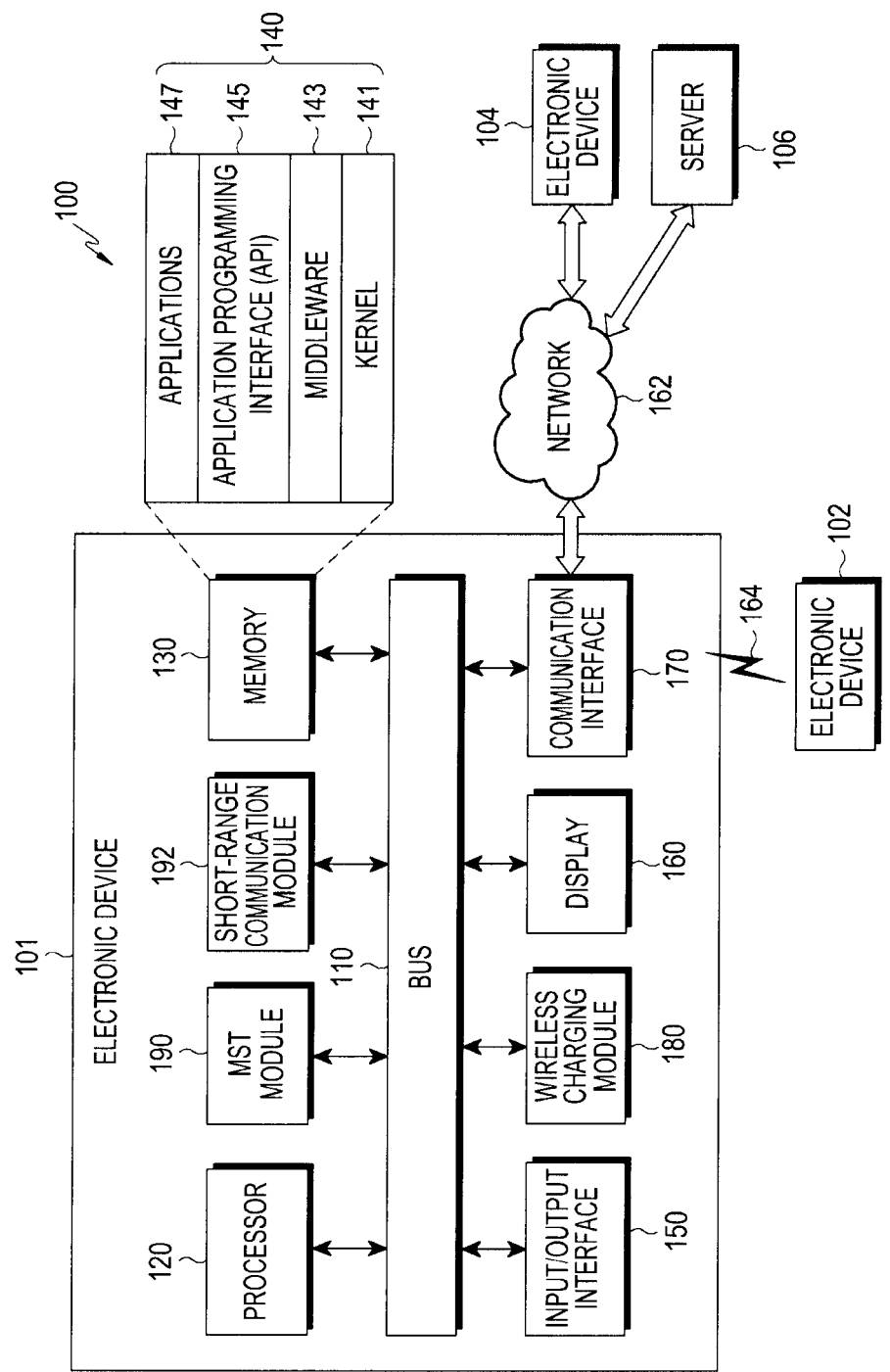
FIG. 1 is a schematic diagram illustrating an electronic device in a network environment according to an embodiment.

Hereinafter, various embodiments will be described with reference to the accompanying drawings. The embodiments and the terms used therein are not intended to limit the technology disclosed herein to the specific embodiments disclosed herein, and should be understood to include various modifications, equivalents, and/or alternatives of the corresponding embodiments. In describing the drawings, similar reference numerals may be used to designate similar constituent elements. As used herein, singular forms may include plural forms as well unless the context clearly indicates otherwise. The expression "a first," "a second," "the first," or "the second" may refer to corresponding components without implying an order of importance, and are used merely to distinguish each component from the others without unduly limiting the components. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments may be interchangeably used with, for example, "suitable for," "having the capacity to," "designed to," "adapted to," "made to," or "capable of" in terms of hardware or software, depending on the context. Alternatively, in some situations, the expression "device configured to" may mean that the device, together with other devices or components, "is able to." For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

An electronic device according to various embodiments may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit). In some embodiments, the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyrocompass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.). According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like). In various embodiments, the electronic device may be flexible, or may be a combination of one or more of the aforementioned various devices. The electronic device according to one embodiment is not limited to the above described devices. The term "user" as used in various embodiments may indicate a person who uses an electronic device or a device (e.g., artificial intelligence electronic device) that uses an electronic device.

An electronic device 101 in a network environment 100 according to an embodiment will be described with reference to FIG. 1. The electronic device 101 may include a bus 110, a processor 120, a memory 130, an input/output interface 150, a display 160, and a communication interface 170. In some embodiments, the electronic device 101 may exclude at least one of the elements, or may add other elements thereto. The bus 110 may include a circuit for connecting the elements 110 to 170 with each other and transferring communication data (e.g., control messages or data) between the elements. The processor 120 may include at least one of a central processing unit, an application processor, or a communication processor (CP). The processor 120, for example, may perform calculation or data processing in relation to control or communication of one or more other elements of the electronic device 101. The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. No claim element herein is to be construed under the provisions of 35 U.S.C. 112(f), unless the element is expressly recited using the phrase "means for."

The memory 130 may include a volatile or non-volatile memory. For example, the memory 130 may store commands or data in relation to one or more other elements of the electronic device 101. According to an embodiment, the memory 130 may store software or programs 140. For example, the programs 140 may include a kernel 141, middleware 143, an application programming interface (API) 145, or application programs (or "applications") 147. At least some of the kernel 141, the middleware 143, or the API 145 may be referred to as an "operating system." The kernel 141, for example, may control or manage system resources (e.g., the bus 110, the processor 120, the memory 130, or the like), which are used to execute operations or functions that are implemented in other programs (e.g., the middleware 143, the API 145, or the application programs 147). In addition, the kernel 141 may provide an interface by which the middleware 143, the API 145, or the application programs 147 may access respective elements of the electronic device 101, thereby controlling or managing system resources.

The middleware 143, for example, may play the intermediate role between the API 145 or the application programs 147 and the kernel 141 to communicate with each other for transmission and reception of data. The middleware 143 may process one or more operation requests received from the application programs 147 according to priority. For example, the middleware 143 may give priority for using the system resources (e.g., the bus 110, the processor 120, the memory 130, or the like) of the electronic device 101 to at least one of the application programs 147, and may process the one or more operation requests. The API 145, for example, may be an interface by which the applications 147 control functions provided by the kernel 141 or the middleware 143. For example, the API 145 may include one or more interfaces or functions (e.g., instructions) for file control, window control, image processing, text control, or the like. The input/output interface 150, for example, may transfer commands or data received from a user or other external devices to other elements of the electronic device 101, or may output commands or data received from the other elements of the electronic device 101 to the user or other external devices.

The display 160, for example, may include a liquid crystal display (LCD), a light-emitting diode (LED) display, an organic light-emitting diode (OLED) display, a microelectromechanical systems (MEMS) display, or an electronic paper display. For example, the display 160 may display a variety of content (e.g., text, images, videos, icons, symbols, or the like) to the user. The display 160 may include a touch screen, and may receive a touch input, a gesture input, a proximity input, or a hovering input using electronic pens or a user's body part. The communication module 170, for example, may establish communication between the electronic device 101 and external devices (e.g., a first external electronic device 102, a second external electronic device 104, or a server 106). For example, the communication module 170 may be connected to the network 162 through wireless communication or wired communication in order to thereby communicate with external devices (e.g., the second external electronic device 104 or the server 106).

For example, the wireless communication may include cellular communication that uses at least one of LTE (Long-Term Evolution), LTE-A (LTE Advance), CDMA (Code Division Multiple Access), WCDMA (Wideband CDMA), a UMTS (Universal Mobile Telecommunications System), WiBro (Wireless Broadband), a GSM (Global System for Mobile Communications), or the like. According to an embodiment, the wireless communication, as illustrated by the element 164 in FIG. 1, shown for example, may include at least one of Wi-Fi (Wireless Fidelity), Li-Fi (Light Fidelity), Bluetooth, Bluetooth Low Energy (BLE), ZigBee, NFC (Near Field Communication), magnetic secure transmission, Radio Frequency (RF), or a Body Area Network (BAN). According to an embodiment, the wireless communication may include a GNSS. The GNSS, for example, may be a GPS (Global Positioning System), a GLONASS (Global Navigation Satellite System), the BeiDou Navigation Satellite System (hereinafter, "BeiDou"), Galileo, or the European global satellite-based navigation system. Hereinafter, "GPS" may be used interchangeably with "GNSS" in the present specification. For example, the wired communication may include at least one of a USB (Universal Serial Bus), an HDMI (High-Definition Multimedia Interface), RS-232 (Recommended Standard 232), power line communication, or a POTS (Plain Old Telephone Service). The network 162 may include at least one of the telecommunication networks, such as a computer network (e.g., LAN or WAN), the Internet, or a telephone network.

The first and second external electronic devices 102 and 104 may be the same as, or different from, the electronic device 101 as to the type thereof. According to various embodiments, at least some or all of the operations executed in the electronic device 101 may be executed by one or more other electronic devices (e.g., the electronic device 102 or 104, or the server 106). According to an embodiment, in the case where the electronic device 101 executes specific functions or services automatically or upon request, the electronic device 101 may make a request to the other devices (e.g., the electronic device 102 or 104, or the server 106) for at least some of the functions related to the same, instead of executing the functions or services by itself, or in addition thereto. The other electronic devices (e.g., the electronic device 102 or 104, or the server 106) may execute the requested functions or additional functions, and may transfer the results thereof to the electronic device 101. The electronic device 101 may provide the requested functions or services by providing the results without further processing or by additionally processing the same. To this end, for example, cloud computing, distributed computing, or client-server computing technology may be used.

A wireless charging module 180 may receive wireless power from a wireless power receiver, or may transmit wireless power to another electronic device. The wireless charging module 180, based on an inductive or resonant manner, may receive or transmit wireless power. The wireless charging module 180 may include a coil for transmitting/receiving wireless power.

An MST module 190, for example, may be provided as a module independent from the communication interface 170. The MST module 190 may perform MST communication with other electronic devices. For example, the MST module 190 may emit an electromagnetic field the magnitude of which varies with time in order to transmit signals containing information. The information may include information for wireless payment. Another electronic device (e.g., a POS terminal) may receive a signal containing information from the electronic device 101 by detecting a change in the magnitude of the electromagnetic field over time. The MST module 190 may include a coil for emitting or detecting an electromagnetic field. The MST module 190 may also receive a signal from another electronic device by detecting a change in the electromagnetic field received therefrom over time.

A short-range communication module 192 may include at least one of, for example, a cellular module, a Wi-Fi module, a Bluetooth module, a GNSS module, an NFC module, and an RF module. The short-range communication module, for example, may be provided as an independent module separately from the communication interface. According to an embodiment, the short-range communication module may change the operation mode under the control of the processor 120. The processor may control the short-range communication module so as to transmit and receive data to and from external electronic devices.

Figure 2A:
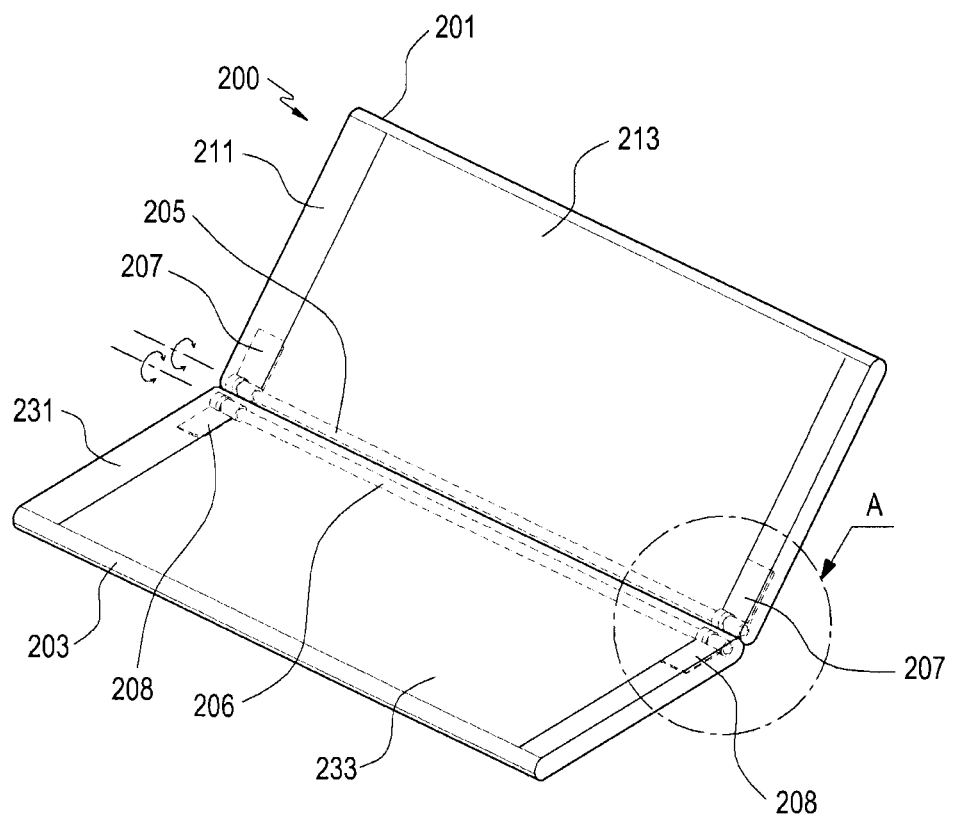
FIG. 2A is a perspective view illustrating an electronic device according to one of the various embodiments.
Figure 2B:
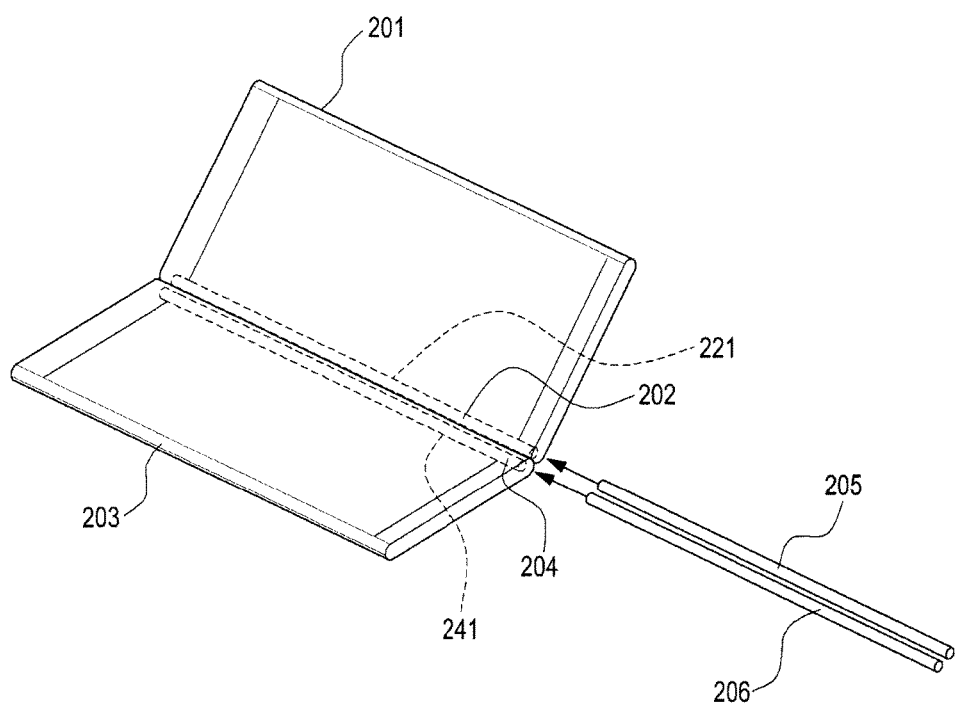
FIG. 2B is a perspective view illustrating first and second magnetic members, which are separated from first and second receptacles, in an electronic device according to one of the various embodiments.

FIG. 2A is a perspective view illustrating an electronic device (e.g., the electronic device 101 in FIG. 1) according to one of the various embodiments. FIG. 2B is a perspective view illustrating first and second magnetic members of an electronic device, which are separated from first and second receptacles, according to one of the various embodiments.

Referring to FIGS. 2A and 2B, an electronic device 200, according to one of the various embodiments, may include a first housing 201, a second housing 203, a first magnetic member 205, a second magnetic member 206, a first stopper 207, and a second stopper 208. The first housing 201 may include a first surface 211 which in turn includes a first display 213, a second surface formed in the opposite direction of the first surface 211, a first side surrounding the space between the first surface 211 and the second surface, and a first receptacle 221 formed adjacent to the first side. The first receptacle 221 may be formed along the longitudinal direction of the first housing 201.

According to an embodiment, the second housing 203 may include a third surface 231 which in turn includes a second display 233, a fourth surface formed in the opposite direction of the third surface 231, a second side surrounding the space between the third surface and the fourth surface, and a second receptacle 241 formed adjacent to the second side. The second receptacle 241, which corresponds to the first receptacle, may be formed along the longitudinal direction of the second housing 203.

According to an embodiment, the first magnetic member 205 may be in the shape of a cylinder. The first receptacle 221 may receive at least one of the first magnetic member 205 so that the first magnetic member 205 is rotatable therein. The first receptacle 221 may have a first hollow 202 corresponding to the first magnetic member 205. The first magnetic member 205 may be inserted into the first hollow 202 so that it is rotatable therein. According to an embodiment, the first magnetic member 205 may be in various shapes that can be rotated, without being limited to the cylindrical shape.

According to an embodiment, the second magnetic member 206 may be in the shape of a cylinder. The second receptacle 241 may receive at least one of the second magnetic member 206 so that the second magnetic member 206 is rotatable therein. The second receptacle 241 may have a second hollow 204 corresponding to the second magnetic member 206. The second magnetic member 206 may be inserted into the second hollow 204 so that it is rotatable therein. The second magnetic member 206 may allow the first side of the first housing 201 to couple to the second side of the second housing 203 by means of magnetic force with the first magnetic member 205. The second magnetic member 206 may be of a size that corresponds to that of the first magnetic member 205. According to an embodiment, the second magnetic member 206 may be in various shapes that can be rotated, without being limited to the cylindrical shape.

According to an embodiment, the first stopper 207 may be disposed inside the first housing 201, and may restrict the rotation of the first magnetic member 205. The first stopper 207 may comprise of two stoppers that are coupled to both ends of the first magnetic member 205. The second stopper 208 may be disposed inside the second housing 203, and may restrict the rotation of the second magnetic member 206. The second stopper 208 may comprise of two stoppers that are coupled to both ends of the second magnetic member 206.

According to an embodiment, when the first housing 201 rotates relative to the second housing 203, the second stopper 208 may allow the rotation of at least one of the second magnetic member 206 such that magnetic force between at least one of the second magnetic member 206 and at least one of the first magnetic member 205 is generated.

According to an embodiment, the first stopper 207 may be rotated along with the first housing 201. When the first stopper 207 is locked to at least one of the first magnetic member 205, the angle formed between the first surface 211 of the first housing 201 and the third surface 231 of the second housing 203, for example, can be maintained.

According to an embodiment, the electronic device 200 may include the first housing 201, the first display 213, the first magnetic member 205, and the first stopper 207, and may not include the second housing. Instead, the second housing 203 may be a housing of another electronic device, and the electronic device 200 may be connected to another electronic device by means of magnetic force between the first magnetic member 205 and a magnetic member included in the housing of the other electronic device.

Figure 3:
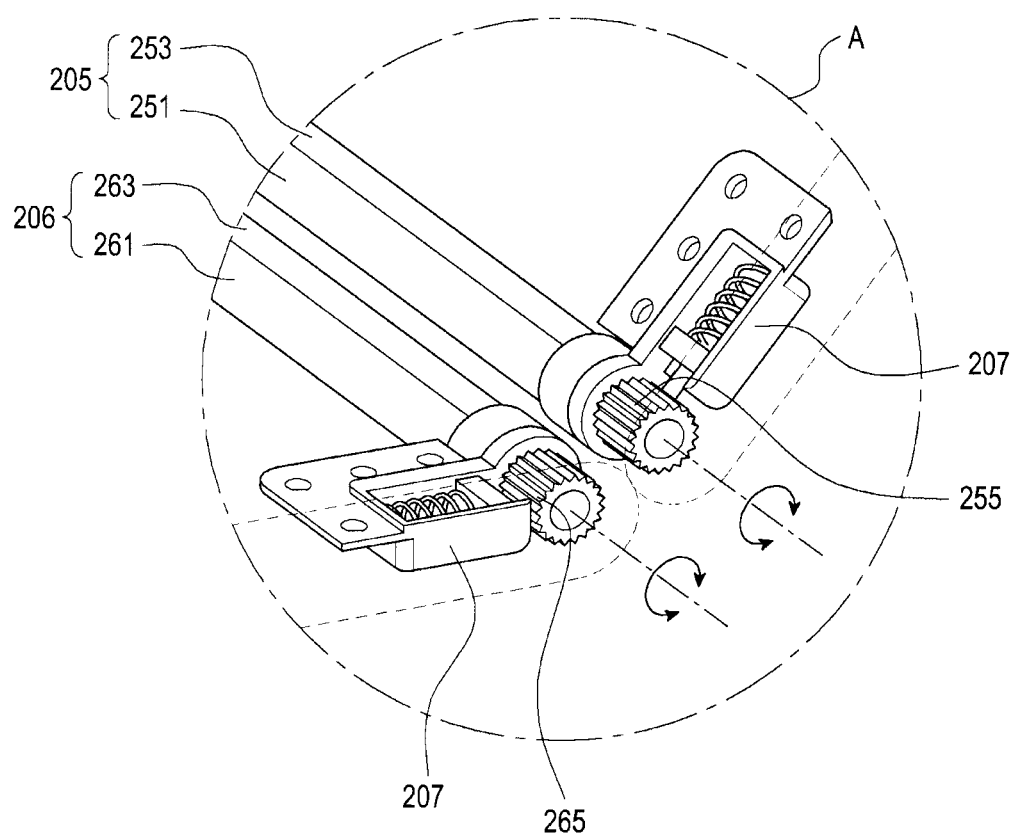
FIG. 3 is an enlarged perspective view of the portion A in FIG. 2A according to one of the various embodiments.
Figure 4:
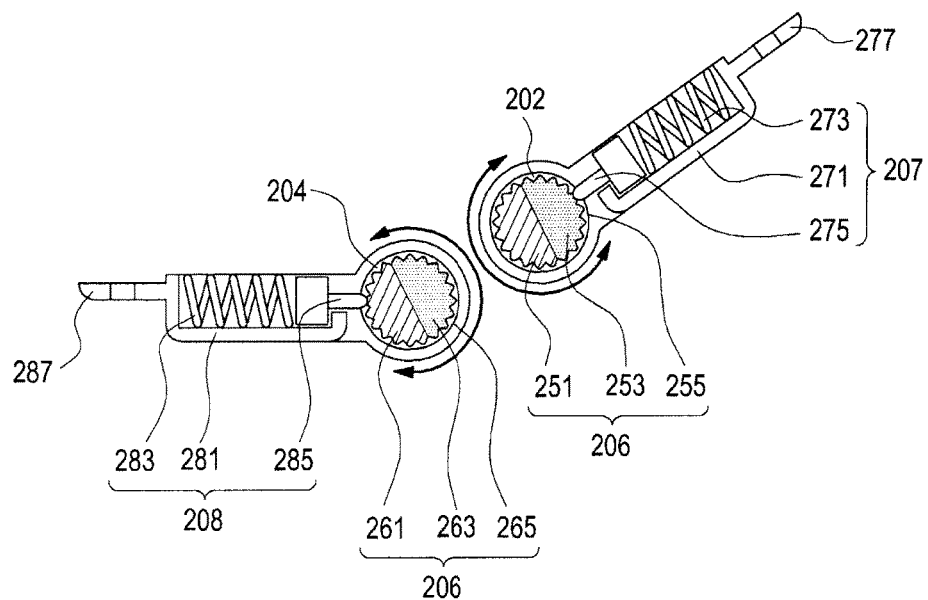
FIG. 4 is a cross-sectional view illustrating first and second magnetic members and first and second stoppers of an electronic device according to one of the various embodiments.

FIG. 3 is an enlarged perspective view of the portion A in FIG. 2A according to one of the various embodiments. FIG. 4 is a cross-sectional view illustrating first and second magnetic members (e.g., the first and second magnetic members 205 and 206 in FIG. 2A) and first and second stoppers of an electronic device (e.g., the first stopper 207 and the second stopper 208 in FIG. 2A) according to one of the various embodiments.

Referring to FIGS. 3 and 4, the first magnetic member 205 may include a first pole 251, a second pole 253, and a plurality of first gear teeth 255. For example, the first pole 251 may be an N-pole, and the second pole 253 may be an S-pole. The first pole 251 may be formed on one half of the outer circumferential surface of the cylinder along the longitudinal direction thereof. The second pole 253 may be formed on the other half of the outer circumferential surface of the cylinder along the longitudinal direction thereof. The plurality of first gear teeth 255 may be formed at opposite ends of the first magnetic member 205. However, the present disclosure is not so limited, and the plurality of first gear teeth 255 may be formed at various positions on the outer circumferential surface of the first magnetic member 205, without being limited to the opposite ends of the first magnetic member 205.

According to an embodiment, the second magnetic member 206 may include a third pole 261, a fourth pole 263, and a plurality of second gear teeth 265. For example, the third pole 261 may be an N-pole, and the fourth pole 263 may be an S-pole. The third pole 261 may be formed on one half of the outer circumferential surface of the cylinder along the longitudinal direction thereof. The fourth pole 263 may be formed on the other half of the outer circumferential surface of the cylinder along the longitudinal direction thereof. The plurality of second gear teeth 265 may be formed at opposite ends of the second magnetic member 206. However, the present disclosure is not so limited, and the plurality of second gear teeth 265 may be formed at various positions on the outer circumferential surface of the second magnetic member 206, without being limited to the opposite ends of the second magnetic member 206.

According to an embodiment, the first stopper 207 may include a first body 271, a first elastic member 273, a first locking member 275, and a first coupling member 277. The first body 271 may be disposed in the first housing 201. The first elastic member 273 may be received in the first body 271. The first elastic member 273 may be configured as a spring. However, the present disclosure is not so limited, and the first elastic member 273 may be made of various materials and be configured in various besides a spring. The only requirement for the elastic member 273 is that it provides an elastic force. The first locking member 275 may be configured as a pin. The first locking member 275 may be inserted between the plurality of first gear teeth 255 while being connected to the first elastic member 273, so that it may restrict the rotation of the first magnetic member 205. The first coupling member 277 may extend from the first body 271, and may be coupled to the first housing 201 by means of bolts passing through coupling holes in the first coupling member 277. However, the present disclosure is not so limited, and the first coupling member 277 may be coupled to the first housing 201 in various fastening means besides bolts that couple the first coupling member 277 to the first housing 201.

According to an embodiment, the second stopper 208 may include a second body 281, a second elastic member 283, a second locking member 285, and a second coupling member 287. The second body 281 may be disposed in the second housing 203. The second elastic member 283 may be received in the second body 281. The second elastic member 283 may be configured as a spring. However, the present disclosure is not so limited, and the second elastic member 283 may be made of various materials and be configured in various shapes beside a spring. The only requirement for the elastic member 283 is that it provides an elastic force. The second locking member 285 may be configured in the form of a pin. The second locking member 285 may be inserted between the plurality of second gear teeth 265 while being connected to the second elastic member 283, so that it may restrict the rotation of the second magnetic member 206. The second coupling member 287 may extend from the second body 281, and may be coupled to the second housing 203 by means of bolts passing through coupling holes in the second coupling member 287. However, the present disclosure is not so limited, and the second coupling member 287 may be coupled to the second housing 203 using any of various fastening means besides bolts for coupling the second coupling member 287 to the second housing 203.

Figure 5:
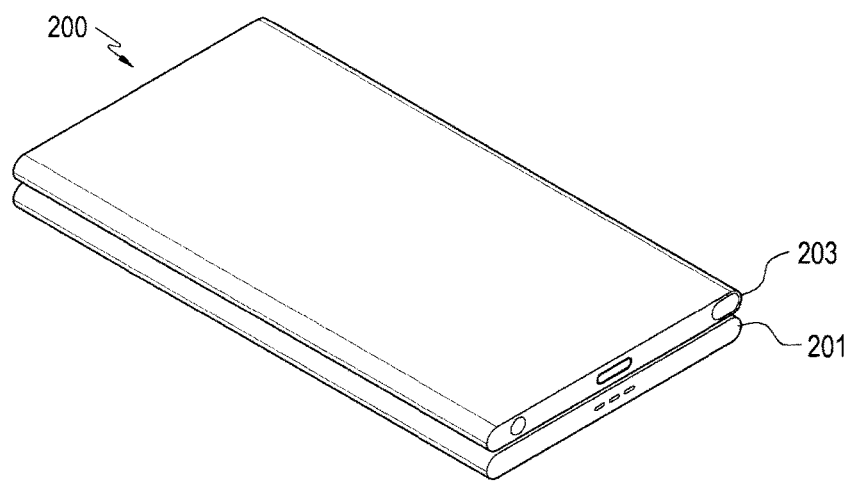
FIG. 5 is a perspective view illustrating the state in which a first surface of a first housing is in contact with a third surface of a second housing in an electronic device according to one of the various embodiments.
Figure 6:
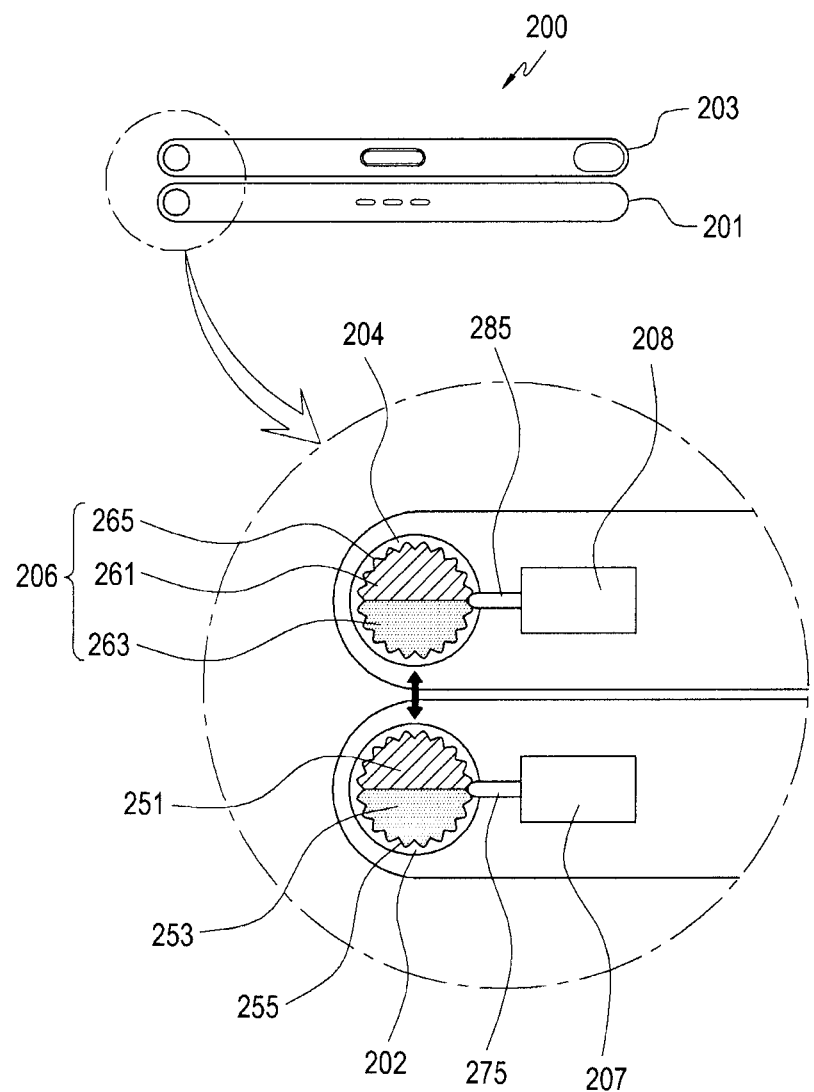
FIG. 6 is a cross-sectional view illustrating the state in which a first surface of a first housing is in contact with a third surface of a second housing in an electronic device according to one of the various embodiments.

FIG. 5 is a perspective view illustrating the state in which a first surface (e.g., the first surface 211 in FIG. 2A) of a first housing (e.g., the first housing 201 in FIG. 2A) is in contact with a third surface (e.g., the third surface 231 in FIG. 2A) of a second housing (e.g., the second housing 203 in FIG. 2A) in an electronic device (e.g., the electronic device 200 in FIG. 2A) according to one of the various embodiments. FIG. 6 is a cross-sectional view illustrating the state in which a first surface of a first housing is in contact with a third surface of a second housing in an electronic device according to one of the various embodiments Referring to FIGS. 5 and 6, the electronic device 200 according to an embodiment may maintain the folded state of the first housing 201 and the second housing 203 by means of magnetic force of the first magnetic member 205 and the second magnetic member 206.

According to an embodiment, when the second housing 203 rotates so as to be folded with respect to the first housing 201, the first magnetic member 205 may be rotated inside the first hollow 202 such that the first pole 251 of the first magnetic member 205 faces the fourth pole 263 of the second magnetic member 206. The first locking member 275 may be inserted between the plurality of first gear teeth 255 to prevent the first magnetic member 205 from rotating.

According to an embodiment, when the second housing 203 rotates so as to be folded with respect to the first housing 201, the second magnetic member 206 may be rotated inside the second hollow 204 such that the fourth pole 263 of the second magnetic member 206 faces the first pole 251 of the first magnetic member 205. The second locking member 285 may be inserted between the plurality of second gear teeth 265 to prevent the second magnetic member 206 from rotating.

Figure 7:
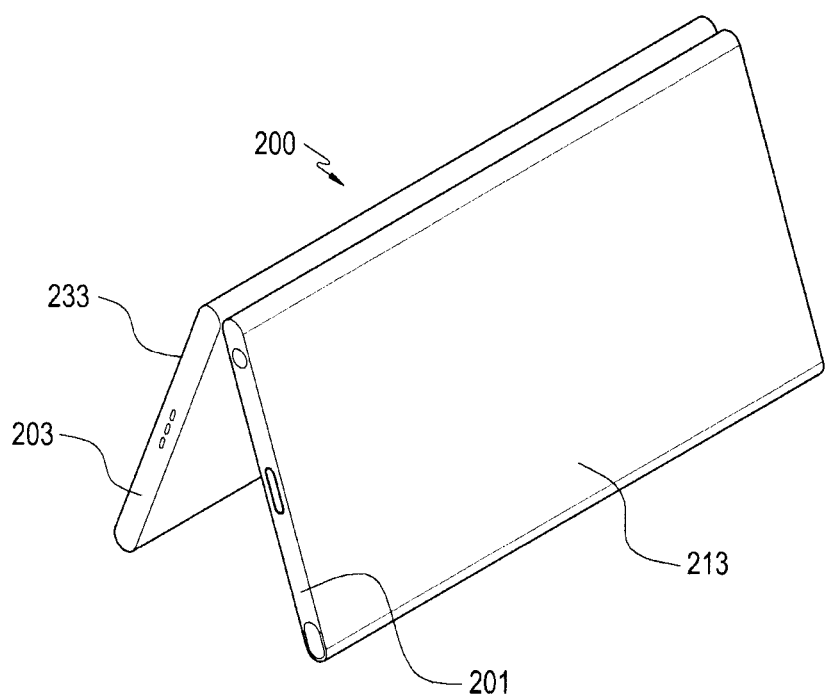
FIG. 7 is a perspective view illustrating the state in which first and second housings of an electronic device are disposed at an angle with respect to each other according to one of the various embodiments.
Figure 8:
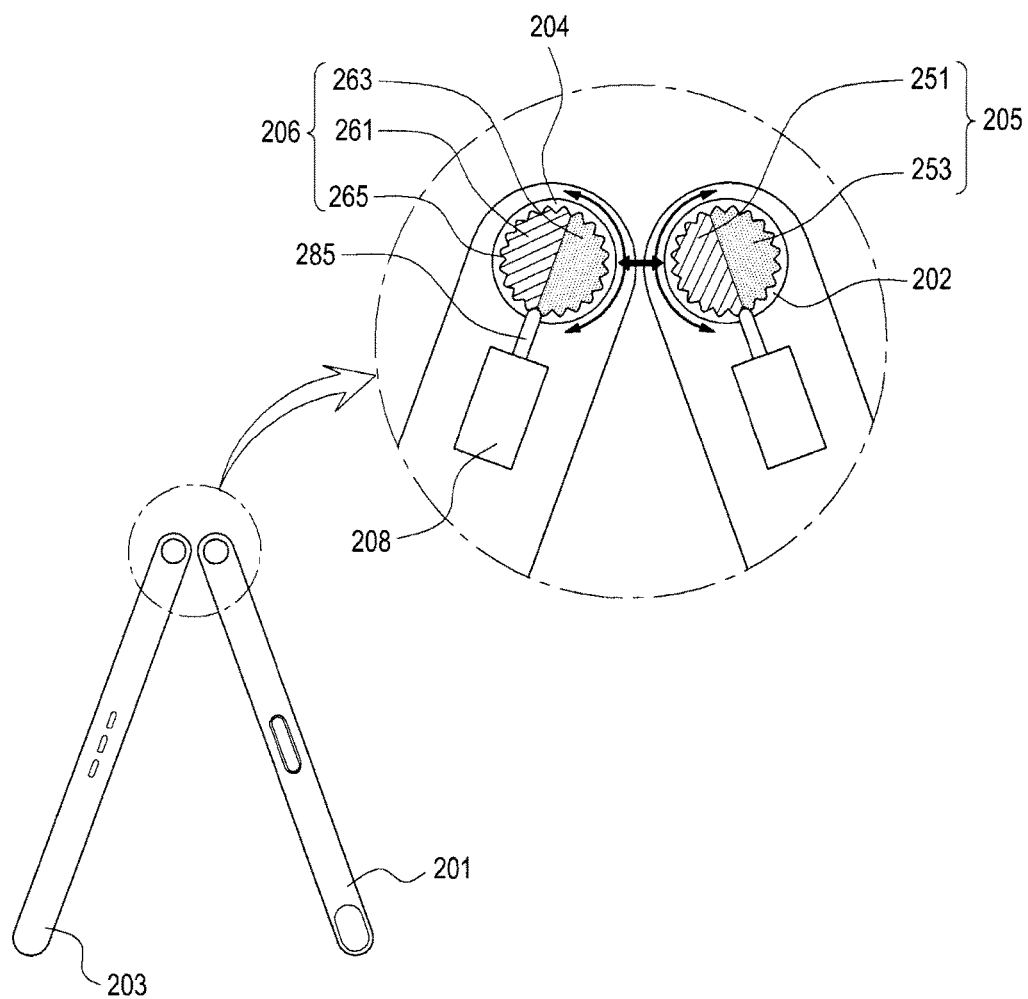
FIG. 8 is a cross-sectional view of an electronic device with its two housings being at an angle with respect to each other according to one of the various embodiments.

FIG. 7 is a perspective view illustrating the state in which first and second housings (e.g., the first and second housings 201 and 203 in FIG. 5) of an electronic device (e.g., the electronic device 200 in FIG. 5) are disposed at an angle with respect to each other according to one of the various embodiments. FIG. 8 is a cross-sectional view of an electronic device with its two housings being at an angle with respect to each other according to one of the various embodiments.

Referring to FIGS. 7 and 8, according to an embodiment, coupling between the first housing 201 and the second housing 203 may be maintained by means of magnetic force between the first magnetic member 205 and the second magnetic member 206.

According to an embodiment, when the second housing 203 rotates so as to be at an angle with respect to the first housing 201, the first magnetic member 205 may be rotated inside the first hollow 202 such that the first pole 251 of the first magnetic member 205 faces the fourth pole 263 of the second magnetic member 206. The first locking member 275 may be inserted between the plurality of first gear teeth 255 to prevent the first magnetic member 205 from rotating.

According to an embodiment, when the second housing 203 rotates so as to be at an angle with respect to the first housing 201, the second magnetic member 206 may be rotated inside the second hollow 204 such that the fourth pole 263 of the second magnetic member 206 faces the first pole 251 of the first magnetic member 205. The second locking member 285 may be inserted between the plurality of second gear teeth 265 to prevent the second magnetic member 206 from rotating. Since the first and second locking members 275 and 285 restrict the rotation of the first and second magnetic members 205 and 206, it is possible to prevent the first and second housings 201 and 203 from rotating relative to each other caused by for example, gravitational pull on the first and second housings 201 and 203. This way, the angle between the first and second housings 201 and 203 may be maintained. For example, the electronic device 200 may be maintained to be disposed in the shape of the letter "A."

Figure 9:
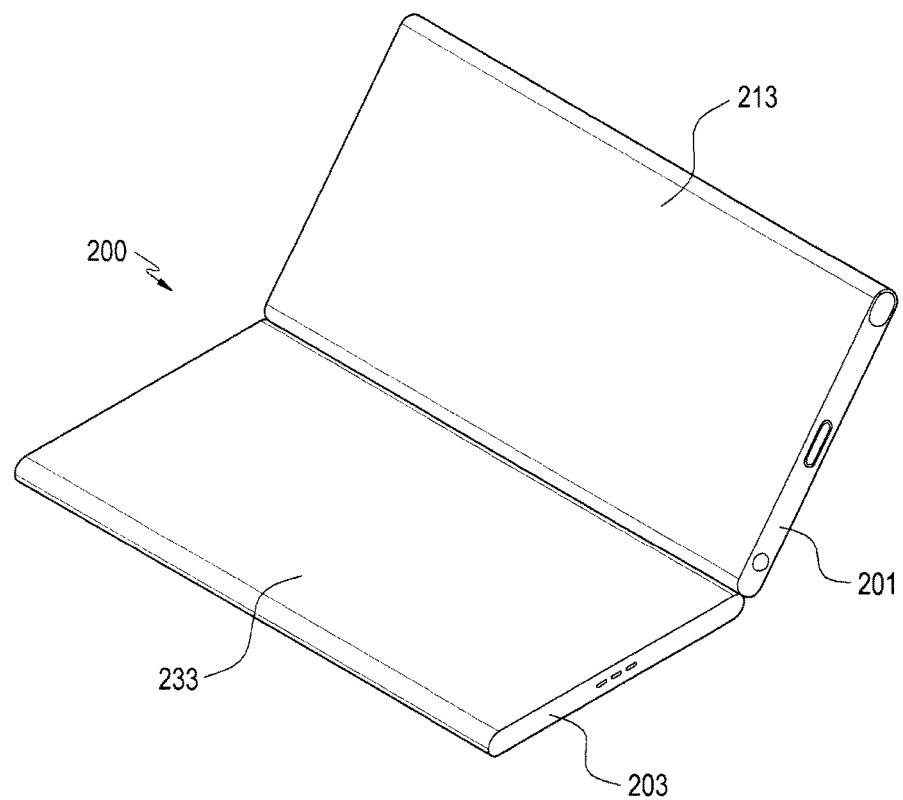
FIG. 9 is a perspective view illustrating the state in which first and second housings of an electronic device are disposed to form another angle therebetween according to one of the various embodiments.
Figure 10:
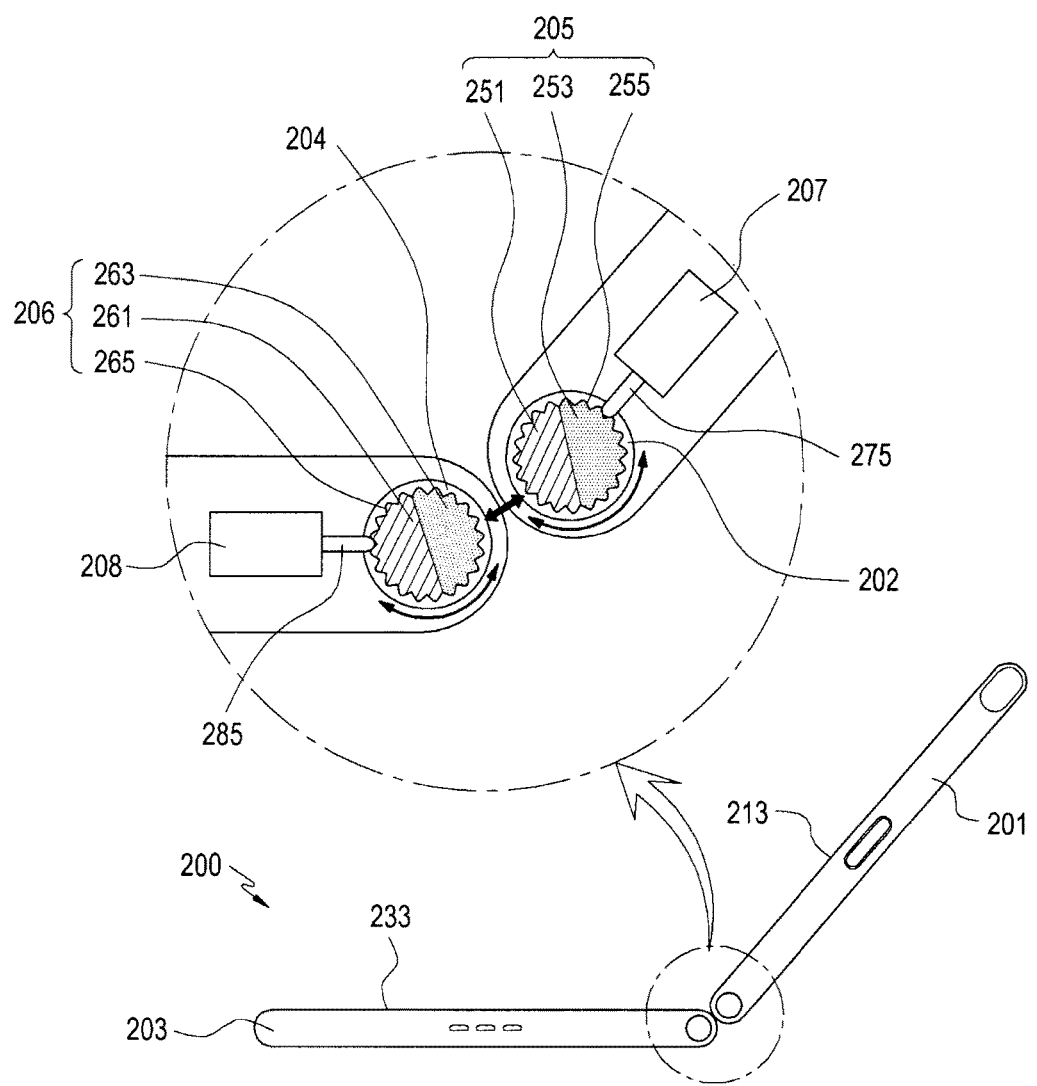
FIG. 10 is a side view illustrating the state in which first and second housings of an electronic device are disposed to form another angle therebetween according to one of the various embodiments.

FIG. 9 is a perspective view illustrating the state in which first and second housings (e.g., the first and second housings 201 and 203 in FIG. 5) of an electronic device (e.g., the electronic device 200 in FIG. 5) are disposed to form another angle therebetween according to one of the various embodiments. FIG. 10 is a side view illustrating the state in which first and second housings of an electronic device are disposed to form another angle therebetween according to one of the various embodiments Referring to FIGS. 9 and 10, the second housing 203 of the electronic device 200 may rotate with respect to the first housing 201 while maintaining the coupling to the first housing 201 by means of magnetic force between the first magnetic member 205 and the second magnetic member 206. This way, an angle between 90 degrees and 180 degrees between the first housing 201 and the second housing 203 may be formed. For example, this use case may be suitable when the second housing 203 placed on a desk or the user's lap.

According to an embodiment, when the first housing 201 is rotated to be between 90 to 180 degrees with respect to the second housing 203, the first magnetic member 205 may be rotated inside the first hollow 202 such that the first pole 251 of the first magnetic member 205 faces the fourth pole 263 of the second magnetic member 206. The first locking member 275 may be inserted between the plurality of first gear teeth 255 to prevent the first magnetic member 205 from rotating. Since the first locking member 275 restricts the rotation of the first magnetic member 205, it is possible to prevent the first housing 201 from further rotation caused by gravitational pull on the first magnetic member 205. This way, the angle between the first housing 201 and the second housing 203 may be maintained.

According to an embodiment, when the first housing 201 is rotated to be between 90 degrees to 180 degrees with respect to the second housing 203, the second magnetic member 206 may be rotated inside the second hollow 204 such that the fourth pole 263 of the second magnetic member 206 faces the first pole 251 of the first magnetic member 205. The second locking member 285 may be inserted between the plurality of second gear teeth 265 to prevent the second magnetic member 206 from rotating.

According to an embodiment, when the user of the electronic device executes an application, an output screen may be displayed on the first display 213, and an input keypad may be displayed on the second display 233. For example, when the user executes a game application, a game screen may be displayed on the first display 213, and game operation keys may be displayed on the second display 233. The user may conveniently use the game operation keys for operating the game on the second display 233 while seeing a wide game screen on the first display 213. According to an embodiment, when the user executes a word processing application, the word processing output screen may be displayed on the first display 213, and a keypad (e.g. keyboard) may be displayed on the second display 233. The keypad may be an English keypad, a Korean keypad, a numeric keypad, and/or a special character keypad. When any one of these keypads are displayed on the second display 233, the keypad may include a keypad switch button for switching from the current keypad to another keypad.

Figure 11:
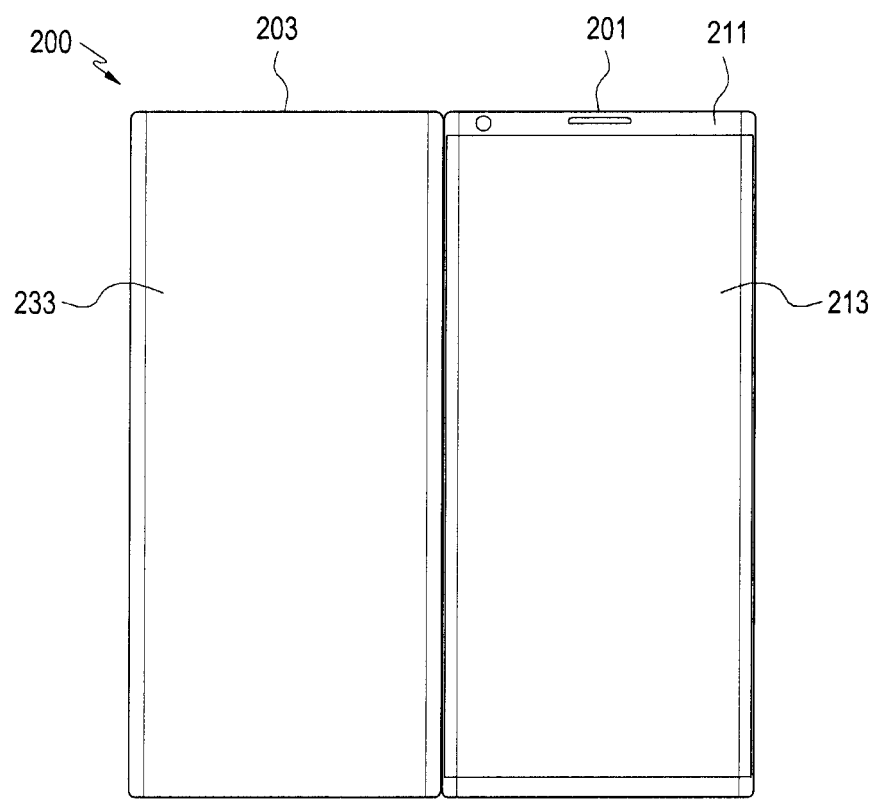
FIG. 11 is a plan view illustrating the state in which a second housing is rotated by 180 degrees with respect to a first housing in an electronic device according to one of the various embodiments.
Figure 12:
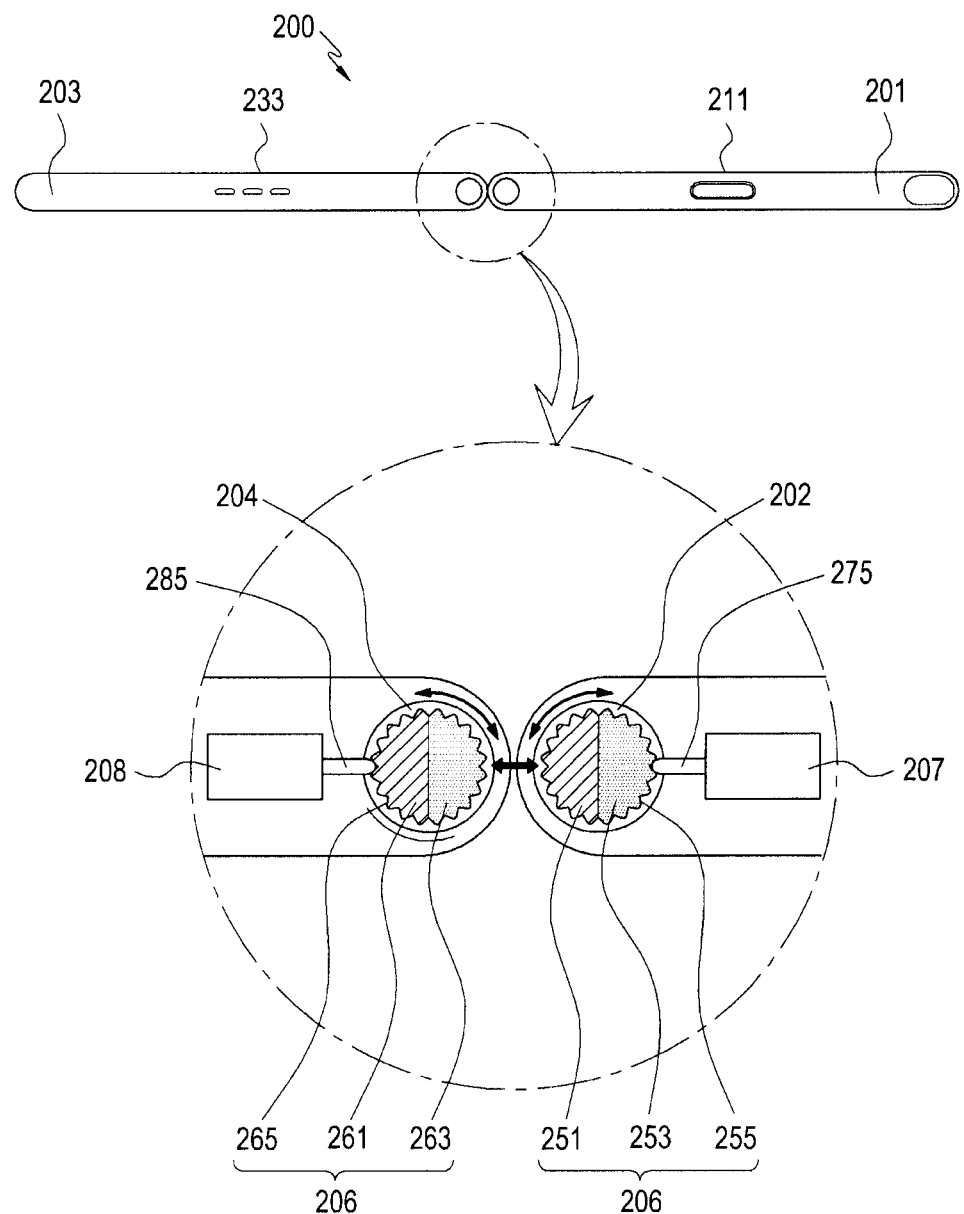
FIG. 12 is a cross-sectional view illustrating the state in which a second housing is rotated by 180 degrees with respect to a first housing in an electronic device according to one of the various embodiments.

FIG. 11 is a plan view illustrating the state in which a second housing (e.g., the second housing 203 in FIG. 5) is rotated by 180 degrees with respect to a first housing (e.g., the first housing 201 in FIG. 5) in an electronic device (e.g., the electronic device 200 in FIG. 5) according to one of the various embodiments. FIG. 12 is a cross-sectional view illustrating the state in which a second housing is rotated by 180 degrees with respect to a first housing in an electronic device according to one of the various embodiments.

Referring to FIGS. 11 and 12, a second housing (e.g., the second housing 203 of an electronic device 200 in FIG. 5), according to an embodiment, may rotate by 180 degrees with respect to a first housing (e.g., the first housing 201 in FIG. 5) while maintaining coupling with the first housing 201 by means of magnetic force between the first magnetic member 205 and the second magnetic member 206.

According to an embodiment, when the second housing 203 rotates by about 180 degrees with respect to the first housing 201, the first magnetic member 205 may be rotated inside the first hollow 202 such that the first pole 251 of the first magnetic member 205 faces the fourth pole 263 of the second magnetic member 206. The first locking member 275 may be inserted between the plurality of first gear teeth 255 to prevent the first magnetic member 205 from rotating.

According to an embodiment, when the second housing 203 rotates by about 180 degrees with respect to the first housing 201, the second magnetic member 206 may be rotated inside the second hollow 204 such that the fourth pole 263 of the second magnetic member 206 faces the first pole 251 of the first magnetic member 205. The second locking member 285 may be inserted between the plurality of second gear teeth 265 to prevent the second magnetic member 206 from rotating. Since the first and second locking members 275 and 285 restrict the rotation of the first and second magnetic members 205 and 206, it is possible to prevent the first and second housings 201 and 203 from further rotation caused by gravitational pull on the first magnetic member 205 and/or the second magnetic member 206. This way, the 180 degree angle between the second housing 203 and the first housing 201 may be maintained.

According to an embodiment, when the angle between the first and second magnetic members 205 and 206 is about 180 degrees, the first and second displays 213 and 233 may combine to display a single image across the first display 213 and the second display 233.

Figure 13:
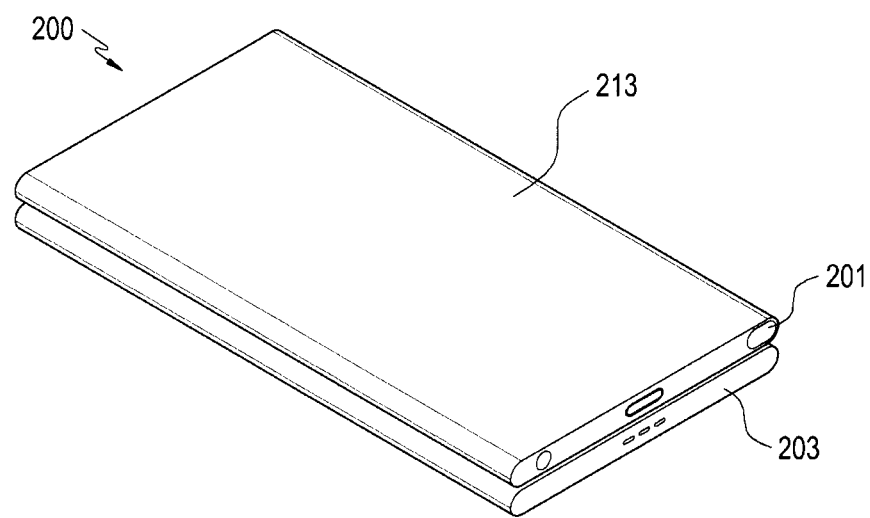
FIG. 13 is a perspective view illustrating the state in which a first surface of a first housing and a third surface of a second housing are directed in opposite directions in an electronic device according to one of the various embodiments.
Figure 14:
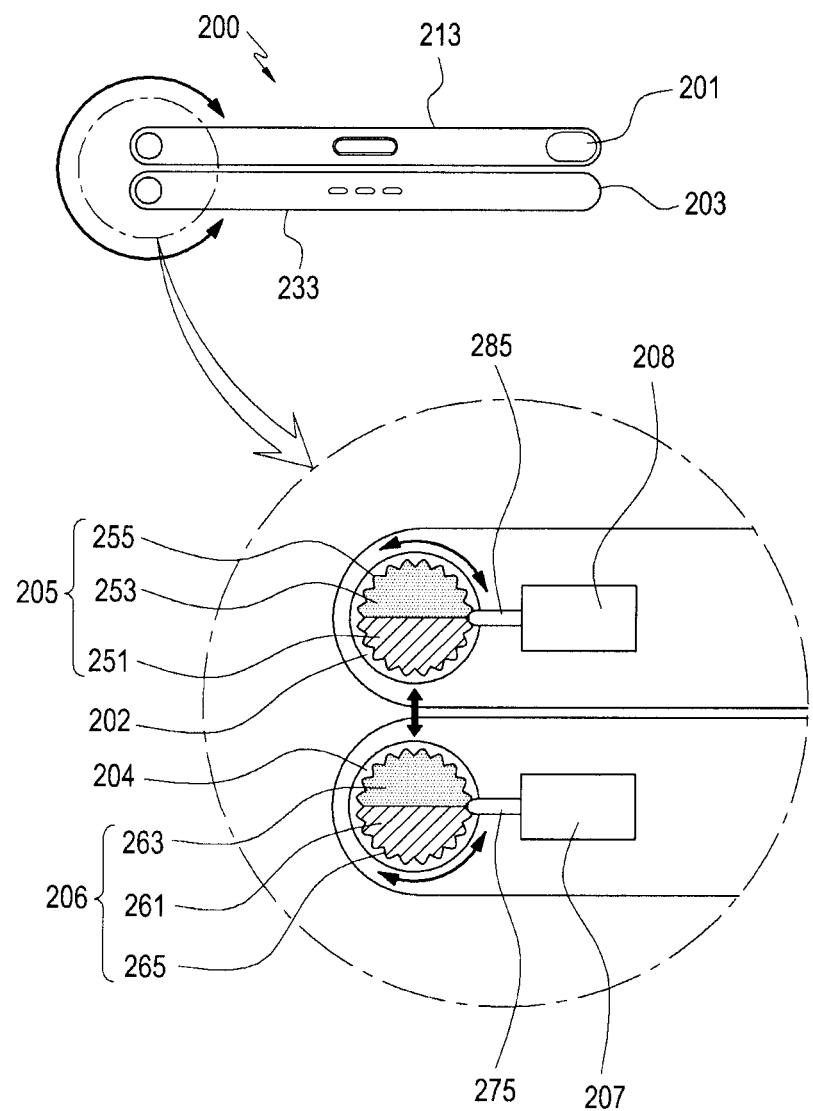
FIG. 14 is a side view illustrating the state in which a first surface of a first housing and a third surface of a second housing are directed in opposite directions in an electronic device according to one of the various embodiments.

FIG. 13 is a perspective view illustrating the state in which a first surface (e.g., the first surface 211 in FIG. 2A) of a first housing (e.g., the first housing 201 in FIG. 2A) and a third surface (e.g., the third surface 231 in FIG. 2A) of a second housing (e.g., the second housing 203 in FIG. 2A) are directed in opposite directions in an electronic device (e.g., the electronic device 200 in FIG. 2A) according to one of the various embodiments. FIG. 14 is a side view illustrating the state in which a first surface of a first housing and a third surface of a second housing are directed in opposite directions in an electronic device according to one of the various embodiments.

Referring to FIGS. 13 and 14, an electronic device 200 according to an embodiment may be folded such that the first surface 211 and the third surface 231 are in opposite directions. This state may be maintained by means of the magnetic force between the first magnetic member 205 and the second magnetic member 206.

According to an embodiment, when the second housing 203 rotates so as to be folded with respect to the first housing 201, the first magnetic member 205 may be rotated inside the first hollow 202 such that the first pole 251 of the first magnetic member 205 faces the fourth pole 263 of the second magnetic member 206. The first locking member 275 may be inserted between the plurality of first gear teeth 255 to prevent the first magnetic member 205 from rotating.

According to an embodiment, when the second housing 203 rotates so as to be folded with respect to the first housing 201, the second magnetic member 206 may be rotated inside the second hollow 204 such that the fourth pole 263 of the second magnetic member 206 faces the first pole 251 of the first magnetic member 205. The second locking member 285 may be inserted between the plurality of second gear teeth 265 to prevent the second magnetic member 206 from rotating. According to an embodiment, the first display 213 and the second display 233 may form the exterior of the electronic device 200 in this configuration.

Figure 15:
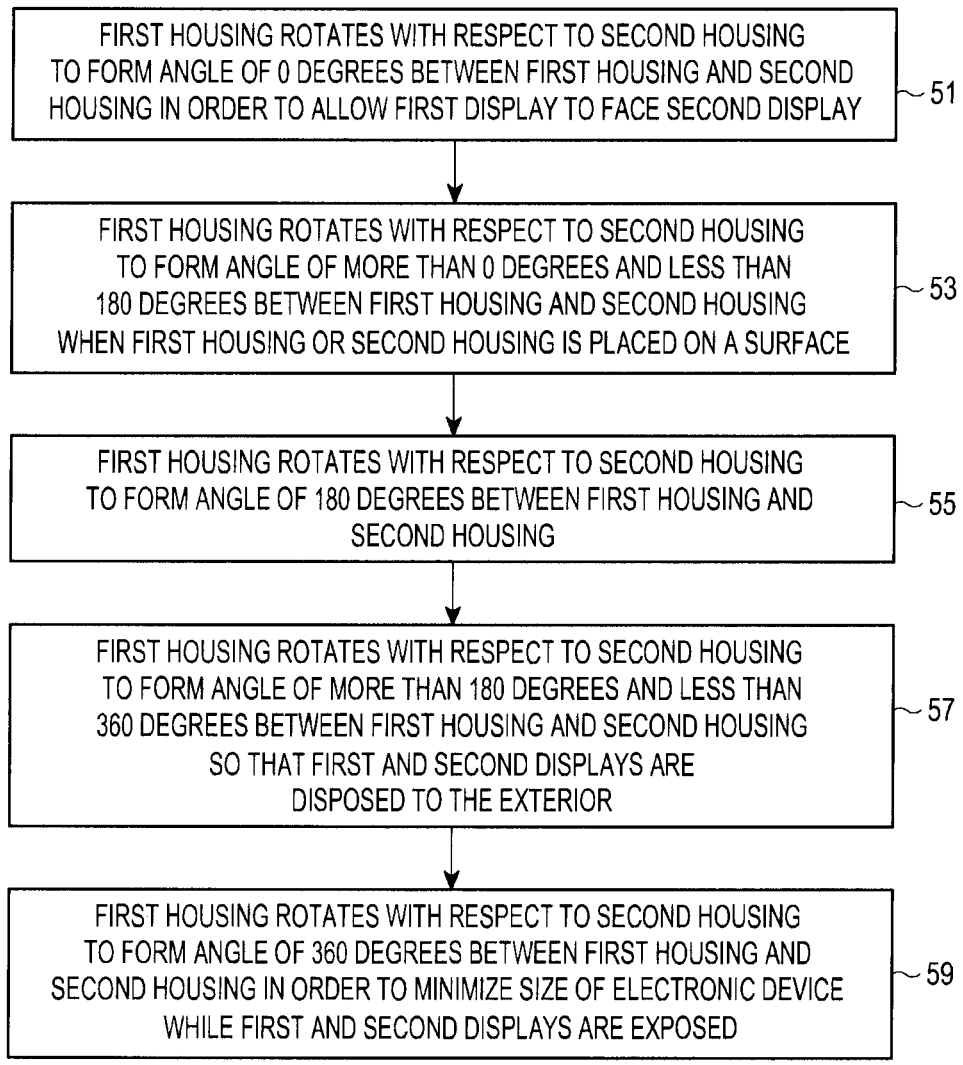
FIG. 15 is a flowchart illustrating the operation of an electronic device according to one of the various embodiments.

FIG. 15 is a flowchart illustrating the operation of an electronic device according to one of the various embodiments.

Referring to FIG. 15, at step 51, the first housing (e.g., the first housing 201 in FIG. 6) may rotate with respect to the second housing (e.g., the second housing 203 in FIG. 6) so as to form an angle of 0 degrees between the first housing (e.g., the first housing 201 in FIG. 6) and the second housing (e.g., the second housing 203 in FIG. 6) in order to allow the first display (e.g., the first display 213 in FIG. 2A) and the second display (e.g., the second display 233 in FIG. 2A) to face each other.

According to an embodiment, at step 53, the first housing (e.g., the first housing 201 in FIG. 9) may rotate with respect to the second housing (e.g., the second housing 203 in FIG. 9) so as to form an angle of more than 0 degrees and less than 180 degrees between the first housing (e.g., the first housing 201 in FIG. 9) and the second housing (e.g., the second housing 203 in FIG. 9) while the first housing (e.g., the first housing 201 in FIG. 9) or the second housing (e.g., the second housing 203 in FIG. 9) is placed on a surface such as a desk.

According to an embodiment, at step 55, the first housing (e.g., the first housing 201 in FIG. 12) may rotate with respect to the second housing (e.g., the second housing 203 in FIG. 12) so as to form an angle of 180 degrees between the first housing (e.g., the first housing 201 in FIG. 12) and the second housing (e.g., the second housing 203 in FIG. 12).

According to an embodiment, at step 57, the first housing (e.g., the first housing 201 in FIG. 12) may rotate with respect to the second housing (e.g., the second housing 203 in FIG. 12) so as to form an angle of more than 180 degrees and less than 360 degrees between the first housing (e.g., the first housing 201 in FIG. 12) and the second housing (e.g., the second housing 203 in FIG. 12) so that the first and second displays are disposed to the exterior of the electronic device 200.

According to an embodiment, at step 59, the first housing (e.g., the first housing 201 in FIG. 13) may rotate with respect to the second housing (e.g., the second housing 203 in FIG. 13) so as to form an angle of 360 degrees between the first housing (e.g., the first housing 201 in FIG. 13) and the second housing (e.g., the second housing 203 in FIG. 13) in order to minimize the size of the electronic device while also exposing the first and second displays to the exterior of the electronic device 200.

Figure 16:
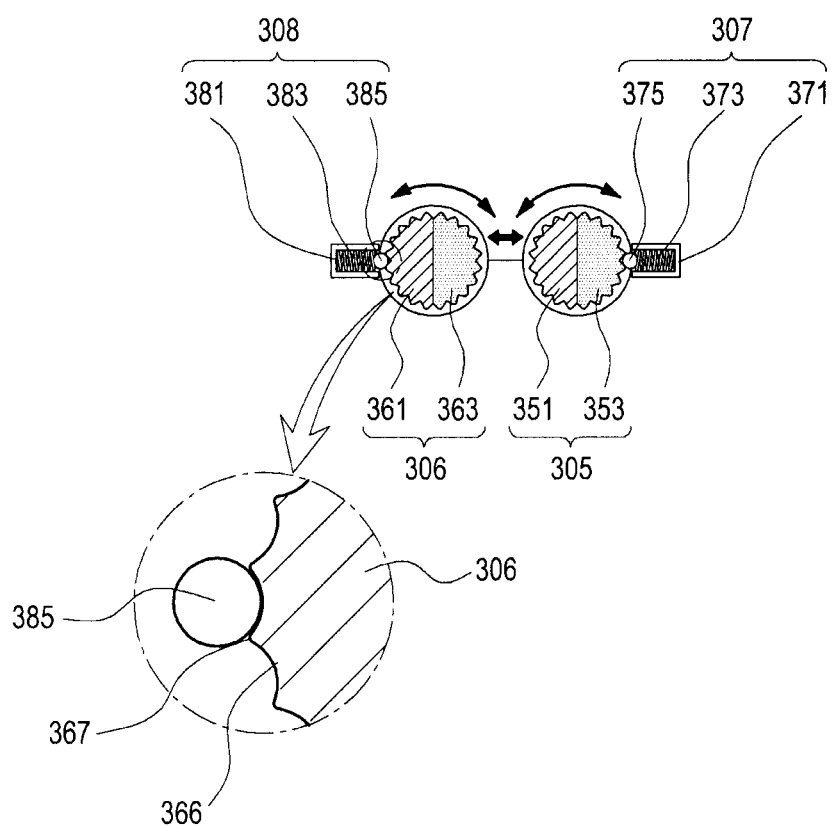
FIG. 16 is a cross-sectional view illustrating first and second magnetic members and first and second stoppers of an electronic device according to another of the various embodiments.

FIG. 16 is a cross-sectional view illustrating first and second magnetic members and first and second stoppers of an electronic device according to another of the various embodiments.

Referring to FIG. 16, an electronic device according to another of the various embodiments may include first and second magnetic members 305 and 306 and first and second stoppers 307 and 308. The first magnetic member 305 may include a first pole 351 and a second pole 353, and the second magnetic member 306 may include a third pole 361 and a fourth pole 363.

According to an embodiment, the first stopper 307 may include a first body 371, a first elastic member 373, and a first locking member 375. The first locking member 375 may be in the shape of a ball. The first locking member 375 may inserted into one of the first grooves formed on the outer circumferential surface of the first magnetic member 305, thereby restricting the rotation of the first magnetic member 305. The first locking member 375 may be inserted into the first grooves using the elastic force of the first elastic member 373.

According to an embodiment, the second stopper 308 may include a second body 381, a second elastic member 383, and a second locking member 385. The second locking member 385 may be in the shape of a ball. The second locking member 385 may be inserted into one of the second grooves 366 formed on the outer circumferential surface of the second magnetic member 306, thereby restricting the rotation of the second magnetic member 306. The second locking member 385 may be inserted into the second grooves 366 using the elastic force of the second elastic member 383.

Figure 17:
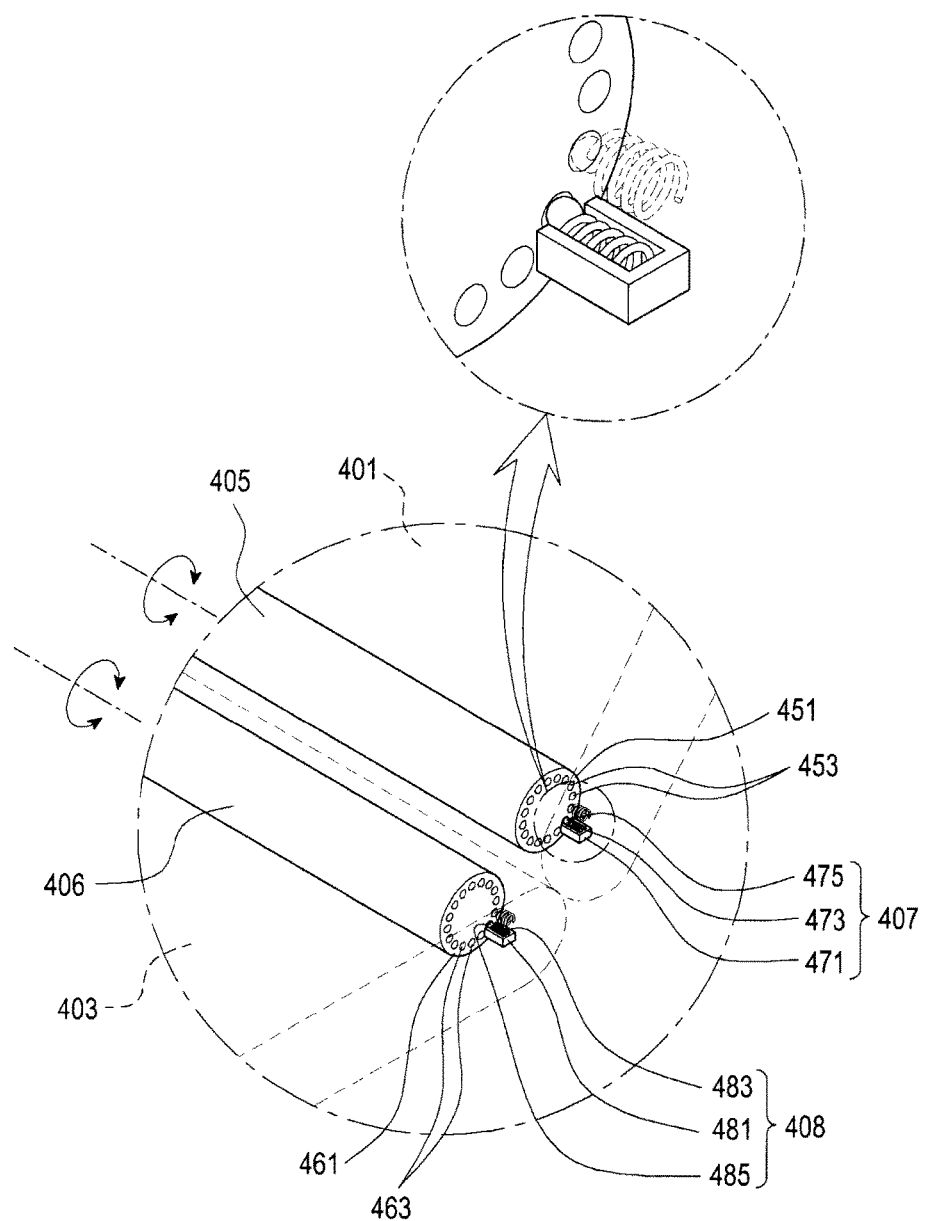
FIG. 17 is a cross-sectional view illustrating first and second magnetic members and first and second stoppers of an electronic device according to another of the various embodiments.

FIG. 17 is a cross-sectional view illustrating first and second magnetic members 405 and 406 and first and second stoppers 407 and 408 of an electronic device according to another of the various embodiments.

Referring to FIG. 17, an electronic device according to another of the various embodiments, may include first and second housings 401 and 403, first and second magnetic members 405 and 406, and first and second stoppers 407 and 408. The first magnetic member 405 may be rotated inside the first housing 401, and the second magnetic member 406 may be rotated inside the second housing 403. A plurality of third hollows 453 may be formed on a cross-sectional side 451 of the first magnetic member 405. A plurality of fourth hollows 463 may be formed on a cross-sectional side 461 of the second magnetic member 406.

According to an embodiment, the first stopper 407 may include a first body 471, a first elastic member 473, and a first locking member 475. The first locking member 475 may be in the shape of a ball. Using the elastic force of the first elastic member 473, the first locking member 475 may be inserted into one of the plurality of third hollows 453, thereby restricting the rotation of the first magnetic member 305.

According to an embodiment, the second stopper 408 may include a second body 481, a second elastic member 483, and a second locking member 485. The second locking member 485 may be in the shape of a ball. Using the elastic force of the second elastic member 483, the second locking member 485 may be inserted into one of the plurality of fourth hollows 463, thereby restricting the rotation of the second magnetic member 406.

Figure 18:
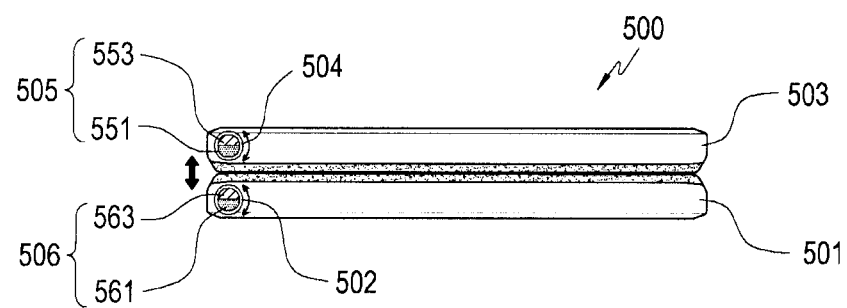
FIG. 18 is a cross-sectional view illustrating the state in which a first surface of a first housing is in contact with a third surface of a second housing in an electronic device according to another of the various embodiments.

FIG. 18 is a cross-sectional view illustrating the state in which a first surface of a first housing 501 is in contact with a third surface of a second housing 503 in an electronic device 500 according to another of the various embodiments.

Referring to FIG. 18, an electronic device 500 according to another embodiment may maintain the folded state of the first housing 501 and the second housing 503 by means of the magnetic force between the first magnetic member 505 and the second magnetic member 506.

According to an embodiment, when the second housing 503 rotates so as to be folded with respect to the first housing 501, the first magnetic member 505 may be rotated inside the first hollow 502 such that the first pole 551 of the first magnetic member 505 faces the fourth pole 563 of the second magnetic member 506.

According to an embodiment, when the second housing 503 rotates so as to be folded with respect to the first housing 501, the second magnetic member 506 may be rotated inside the second hollow 504 such that the fourth pole 563 of the second magnetic member 506 faces the first pole 551 of the first magnetic member 505. The folded state of the first housing 501 and the second housing 503 may be maintained by means of the magnetic force between the first magnetic member 505 and the second magnetic member 506. In this embodiment, description about the plurality of geared teeth may be omitted.

Figure 19:
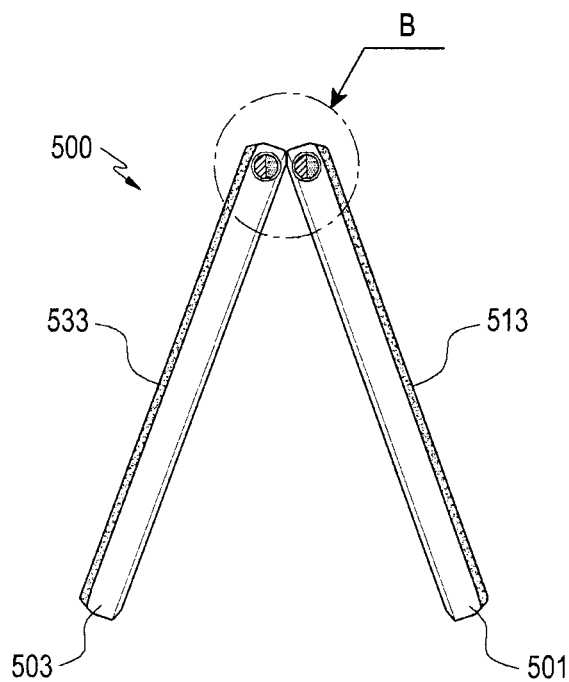
FIG. 19 is a perspective view illustrating the state in which first and second housings of an electronic device are disposed at an angle with respect to each other according to another of the various embodiments.
Figure 20:
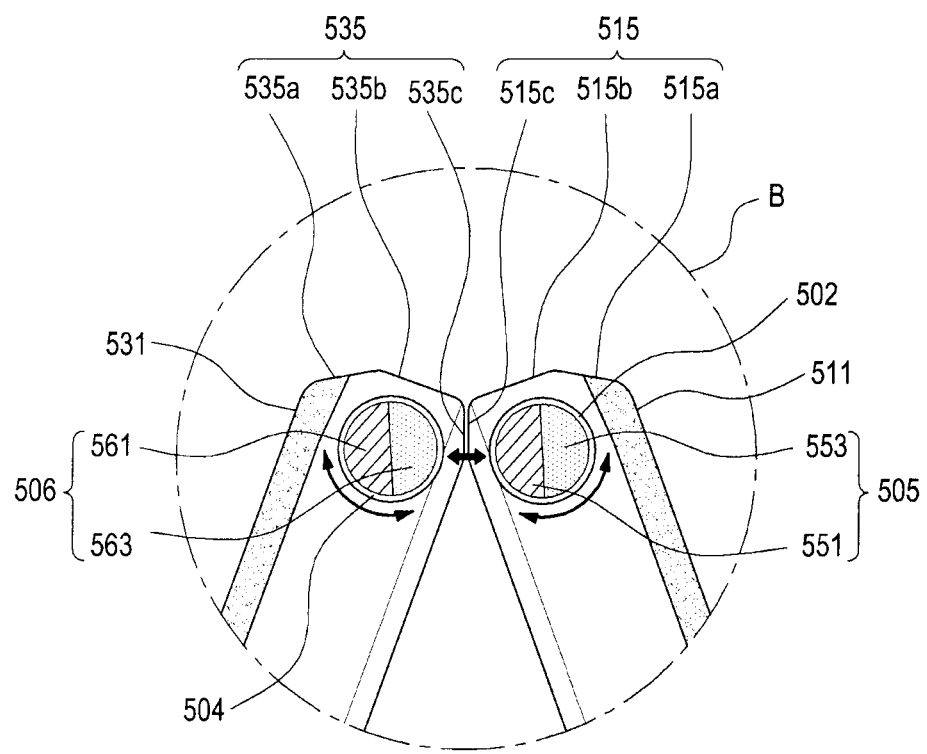
FIG. 20 is an enlarged cross-sectional view of the portion B in FIG. 19 according to another of the various embodiments.

FIG. 19 is a perspective view illustrating the state in which first and second housings (e.g., the first and second housings 501 and 503 in FIG. 18) of an electronic device (e.g., the electronic device 500 in FIG. 18) are disposed at an angle with respect to each other according to another of the various embodiments. FIG. 20 is an enlarged cross-sectional view of the portion B in FIG. 19 according to another of the various embodiments.

Referring to FIGS. 19 and 20, an electronic device 500 according to an embodiment may maintain coupling between the first housing 501 and the second housing 503 by means of magnetic force between the first magnetic member 505 and the second magnetic member 506.

According to an embodiment, a first side 515 of the first housing 501 may include a first contact portion 515a, a second contact portion 515b, and a third contact portion 515c. The first contact portion 515a may be inclined with respect to the first surface 511 of the first housing 501. The second contact portion 515b may be inclined with respect to the first contact portion 515a. The third contact portion 515c may be inclined with respect to the second contact portion 515b.

According to an embodiment, a second side 535 of the second housing 503 may include a fourth contact portion 535a, a fifth contact portion 535b, and a sixth contact portion 535c. The fourth contact portion 535a may be inclined with respect to the third surface 531 of the second housing 503. The fifth contact portion 535b may be inclined with respect to the fourth contact portion 535a. The sixth contact portion 535c may be inclined with respect to the fifth contact portion 535b.

According to an embodiment, when the second housing 503 rotates to be at an angle with respect to the first housing 501, the first magnetic member 505 may be rotated inside the first hollow 502 such that the first pole 551 of the first magnetic member 505 faces the fourth pole 563 of the second magnetic member 506.

According to an embodiment, when the second housing 503 rotates to be at an angle with respect to the first housing 501, the second magnetic member 506 may be rotated inside the second hollow 504 such that the fourth pole 563 of the second magnetic member 506 faces the first pole 551 of the first magnetic member 505.

According to an embodiment, the state in which the third contact portion 515c is in contact with the sixth contact portion 535c may be maintained by means of magnetic force between the first magnetic member 505 and the second magnetic member 506. Due to the angles among the various contact portions in the first side 515 and the second side 535, unintended rotation, for example due to gravity, of the first and second housings 501 and 503 can be prevented. This way, the angle between the first and second housings 501 and 503 can be maintained. For example, the electronic device 500 may be maintained to be disposed in the form of the letter "A."

Figure 21:
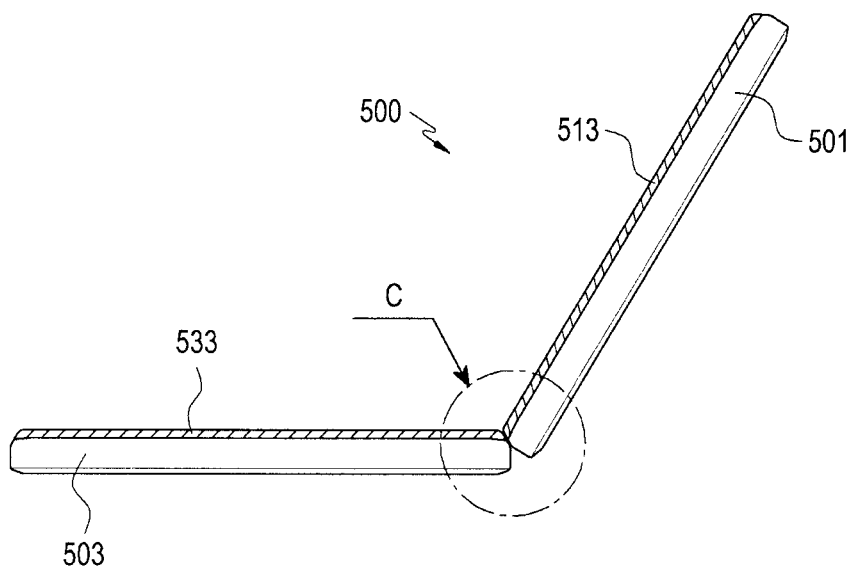
FIG. 21 is a perspective view illustrating the state in which first and second housings of an electronic device are disposed at another angle therebetween according to another of the various embodiments.
Figure 22:
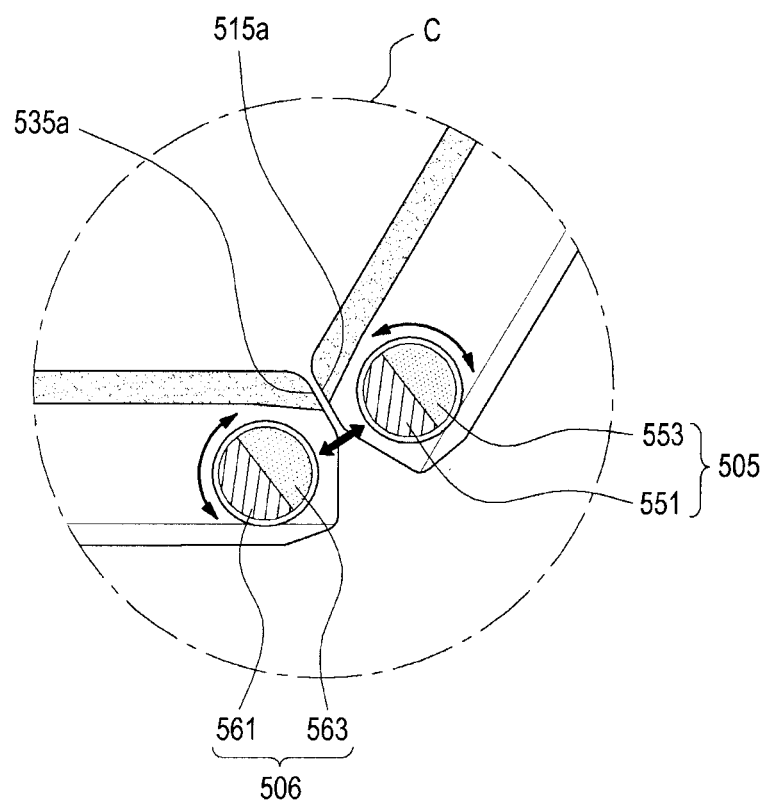
FIG. 22 is an enlarged cross-sectional view of C in FIG. 21 according to another of the various embodiments.

FIG. 21 is a perspective view illustrating the state in which first and second housings (e.g., the first and second housings 501 and 503 in FIG. 18) of an electronic device (e.g., the electronic device 500 in FIG. 18) are disposed at another angle with respect to each other according to another of the various embodiments. FIG. 22 is an enlarged cross-sectional view of C in FIG. 21 according to another of the various embodiments.

Referring to FIGS. 21 and 22, the second housing 503 of the electronic device 500 may rotate with respect to the first housing 501 while maintaining coupling to the first housing 501 by means of magnetic force between the first magnetic member 505 and the second magnetic member 506. This way, an angle between 90 degrees to 180 degrees may be formed between the first housing 501 and the second housing 503. For example, this configuration may be suitable for when the second housing 503 is placed on a surface such as a desk or a user's lap.

According to an embodiment, when the first housing 501 rotates to be between 90 and 180 degrees with respect to the second housing 503, the first magnetic member 505 may be rotated inside the first hollow 502 such that the first pole 551 of the first magnetic member 505 faces the fourth pole 563 of the second magnetic member 506.

According to an embodiment, when the second housing 503 rotates to be between 90 degrees and 180 degrees with respect to the first housing 501, the second magnetic member 506 may be rotated inside the second hollow 504 such that the fourth pole 563 of the second magnetic member 506 faces the first pole 551 of the first magnetic member 505.

According to an embodiment, when the housings are so rotated, the first contact portion 515a may be in contact with the fourth contact portion 535a, and such contact may be maintained by means of the magnetic force between the first magnetic member 505 and the second magnetic member 506. Due to the angles among the various contact portions in the first side 515 and the second side 535, unintended rotation, for example due to gravity, of the first and second housings 501 and 503 can be prevented. This way, the angle between the first and second housings 501 and 503 can be maintained.

Figure 23:
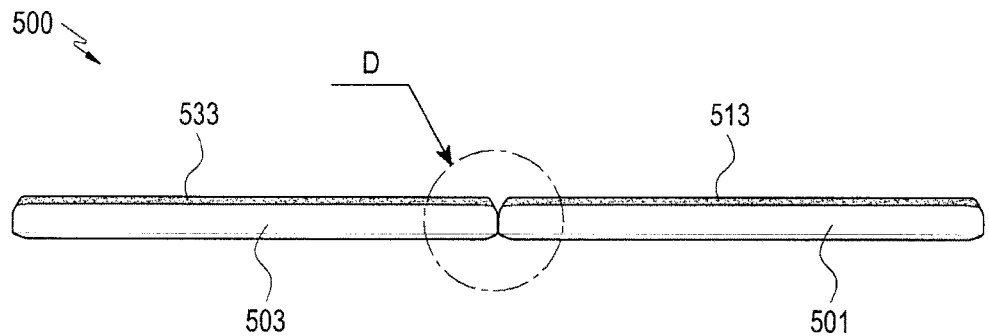
FIG. 23 is a side view illustrating the state in which a second housing of an electronic device is rotated by 180 degrees with respect to a first housing according to another of the various embodiments.
Figure 24:
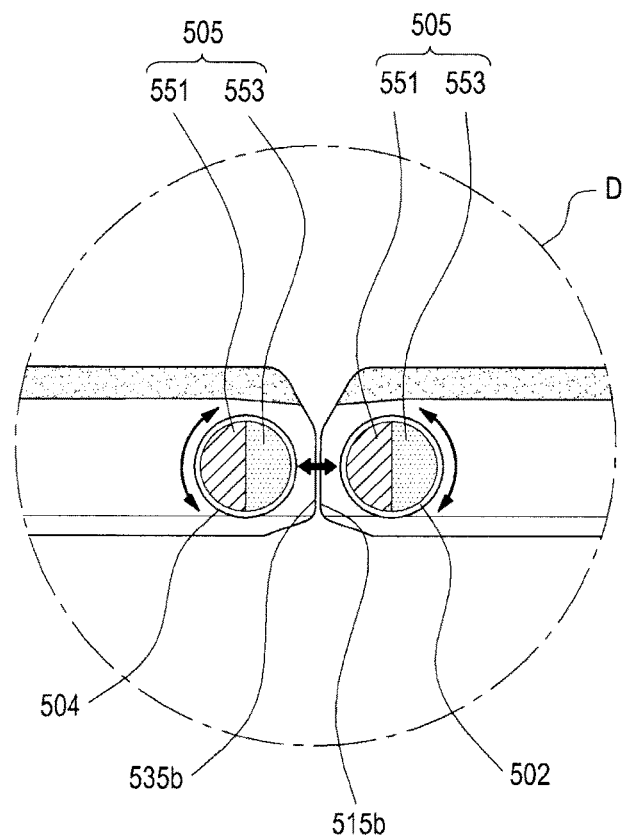
FIG. 24 is an enlarged cross-sectional view of D in FIG. 23 according to another of the various embodiments.

FIG. 23 is a side view illustrating the state in which a second housing (e.g., the second housing 503 in FIG. 21) of an electronic device (e.g., the electronic device 500 in FIG. 21) is rotated by 180 degrees with respect to a first housing (e.g., the first housing 501 in FIG. 21) according to another of the various embodiments. FIG. 24 is an enlarged cross-sectional view of D in FIG. 23 according to another of the various embodiments.

Referring to FIGS. 23 and 24, the second housing (e.g., the second housing 503 in FIG. 21) of the electronic device 500 according to an embodiment may rotate by 180 degrees with respect to the first housing (e.g., the first housing 501 in FIG. 21) while maintaining coupling to the first housing 501 by means of magnetic force between the first magnetic member 505 and the second magnetic member 506.

According to an embodiment, when the first housing 501 rotates by about 180 degrees with respect to the second housing 503, the first magnetic member 505 may be rotated inside the first hollow 502 such that the first pole 551 of the first magnetic member 505 faces the fourth pole 563 of the second magnetic member 506.

According to an embodiment, when the second housing 503 rotates by about 180 degrees with respect to the first housing 501, the second magnetic member 506 may be rotated inside the second hollow 504 such that the fourth pole 563 of the second magnetic member 506 faces the first pole 551 of the first magnetic member 505.

According to an embodiment, the state in which the second contact portion 515b is in contact with the fifth contact portion 535b may be maintained by means of the magnetic force between the first magnetic member 505 and the second magnetic member 506. Due to the angles among the various contact portions in the first side 515 and the second side 535, unintended rotation, for example due to gravity, of the first and second housings 501 and 503 can be prevented. This way, the state in which the second housing 503 is rotated by about 180 degrees with respect to the first housing 501 can be maintained.

Figure 25:
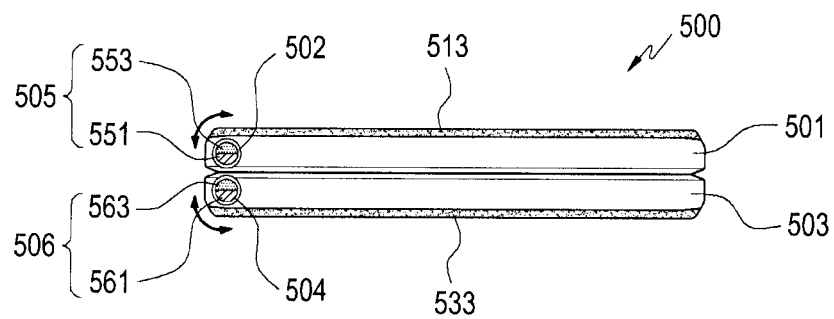
FIG. 25 is a cross-sectional view illustrating the state in which a first surface of a first housing and a third surface of a second housing are directed in opposite directions in an electronic device according to another of the various embodiments.

FIG. 25 is a cross-sectional view illustrating the state in which a first surface of a first housing (e.g., the first housing 501 in FIG. 23) and a third surface of a second housing (e.g., the second housing 503 in FIG. 23) are directed in opposite directions in an electronic device (e.g., the electronic device 500 in FIG. 23) according to another of the various embodiments.

Referring to FIG. 25, an electronic device 500 according to an embodiment may maintain the folded state of the first housing 501 and the second housing 503 by means of magnetic force between the first magnetic member 505 and the second magnetic member 506.

According to an embodiment, when the second housing 503 rotates so as to be folded with respect to the first housing 501, the first magnetic member 505 may be rotated inside the first hollow 502 such that the first pole 551 of the first magnetic member 505 faces the fourth pole 563 of the second magnetic member 506.

According to an embodiment, when the second housing 503 rotates so as to be folded with respect to the first housing 501, the second magnetic member 506 may be rotated inside the second hollow 504 such that the fourth pole 563 of the second magnetic member 506 faces the first pole 551 of the first magnetic member 505. The folded state of the first housing 501 and the second housing 503 may be maintained by means of the magnetic force between the first magnetic member 505 and the second magnetic member 506. For example, the first display 513 and the second display 533 of the electronic device 500 may form the exterior of the electronic device when the first and second housings 501 and 503 are folded with respect to each other in this manner.

Figure 26:
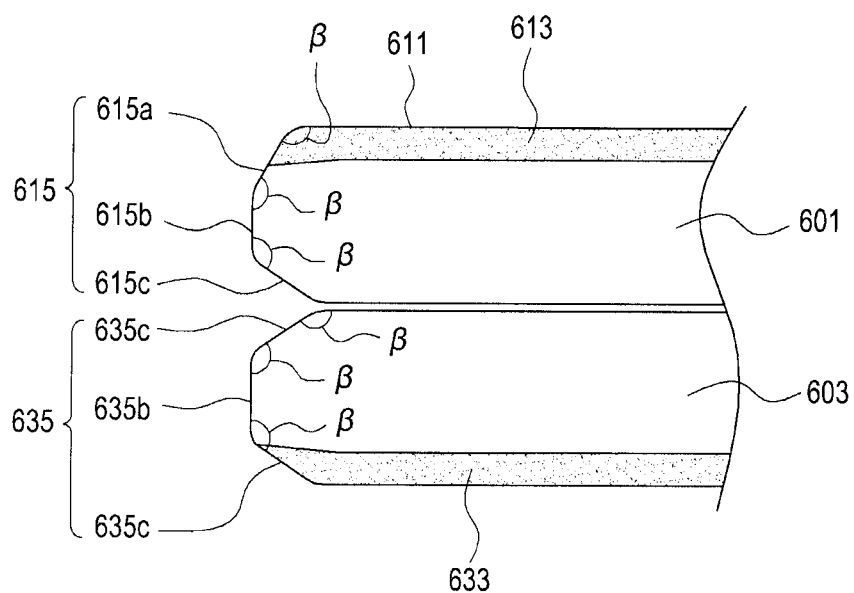
FIG. 26 is a side view of an electronic device according to another of the various embodiments.

FIG. 26 is a side view illustrating an electronic device 600 according to another of the various embodiments.

Referring to FIG. 26, an electronic device 600 according to an embodiment may maintain the folded state of a first housing 601 and a second housing 603 by means of magnetic force between a first magnetic member 605 and a second magnetic member 606.

According to an embodiment, a first side 615 of the first housing 601 may include a first contact portion 615a, a second contact portion 615b, and a third contact portion 615c. The first contact portion 615a may be inclined with respect to the first surface 611 of the first housing 601. The second contact portion 615b may be inclined with respect to the first contact portion 615a. The third contact portion 615c may be inclined with respect to the second contact portion 615b.

According to an embodiment, a second side 635 of the second housing 603 may include a fourth contact portion 635a, a fifth contact portion 635b, and a sixth contact portion 635c. The fourth contact 635a may be inclined with respect to the third surface 631 of the second housing 603. The fifth contact portion 635b may be inclined with respect to the fourth contact portion 635a. The sixth contact portion 635c may be inclined with respect to the fifth contact portion 635b.

According to an embodiment, the length of the first contact portion 615a, the length of the second contact portion 615b, the length of the third contact portion 615c, the length of the fourth contact portion 635a, the length of the fifth contact portion 635b, an the length of the sixth contact portion 635c may be equal to each other.

According to an embodiment, the angle (β) between the first surface 611 and the first contact portion 615a, the angle (β) between the first contact portion 615a and the second contact portion 615b, the angle (γ) between the second contact portion 615b and the third contact portion 615c, the angle (β) between the third surface 631 and the fourth contact portion 635a, the angle (β) between the fourth contact portion 635a and the fifth contact portion 635b, and the angle (β) between the fifth contact portion 635b and the sixth contact portion 635c may be equal to each other. Alternatively, the angle between the first contact portion 615a and the second contact portion 615b may be smaller than the angle between the second contact portion 615b and the third contact portion 615c. And the angle between the fourth contact portion 635a and the fifth contact portion 635b may be smaller than the angle between the fifth contact portion 635b and the sixth contact portion 635c.

Figure 27:
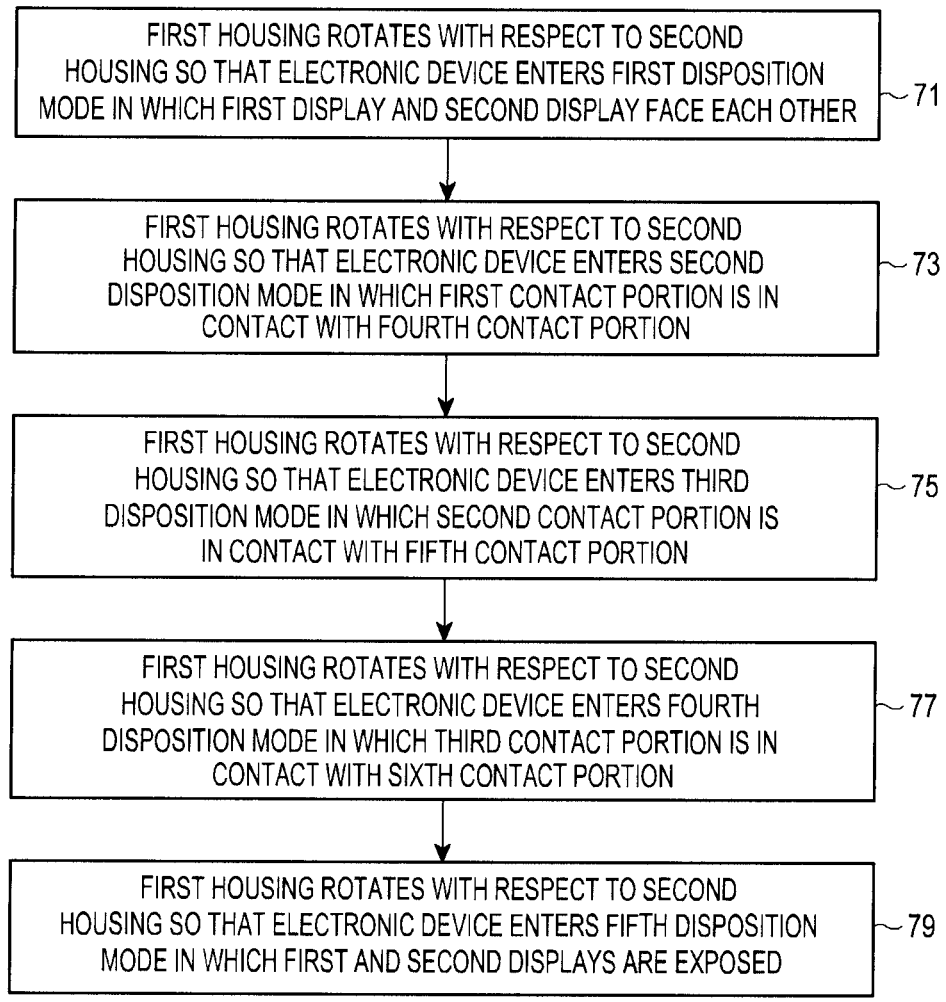
FIG. 27 is a flowchart illustrating the operation of an electronic device according to another of the various embodiments.

FIG. 27 is a flowchart illustrating the operation of an electronic device according to another of the various embodiments.

Referring to FIG. 27, at step 71, the first housing (e.g., the first housing 501) may rotate with respect to the second housing (e.g., the second housing 503) so that the electronic device (e.g., the electronic device 500 in FIG. 18) enters a first disposition mode in which the first display faces the second display.

According to an embodiment, at step 73, the first housing (e.g., the first housing 501 in FIG. 22) may rotate with respect to the second housing (e.g., the second housing 503 in FIG. 22) so that the electronic device (e.g., the electronic device 500 in FIG. 22) enters a second disposition mode in which the first contact portion (e.g., the first contact portion 515a in FIG. 22) is in contact with the fourth contact portion (e.g., the fourth contact portion 535a in FIG. 22).

According to an embodiment, at step 75, the first housing (e.g., the first housing 501 in FIG. 23) may rotate with respect to the second housing (e.g., the second housing 503 in FIG. 23) so that the electronic device (e.g., the electronic device 500 in FIG. 23) enters a third disposition mode in which the second contact portion (e.g., the second contact portion 515b in FIG. 23) is in contact with the fifth contact portion (e.g., the fifth contact portion 535b in FIG. 23).

According to an embodiment, at step 77, the first housing (e.g., the first housing 501 in FIG. 20) may rotate with respect to the second housing (e.g., the second housing 503 in FIG. 20) so that the electronic device (e.g., the electronic device 500 in FIG. 20) enters a fourth disposition mode in which the third contact portion (e.g., the third contact portion 515c in FIG. 25) is in contact with the sixth contact portion (e.g., the sixth contact portion 535c in FIG. 20).

Finally at step 79, the first housing (e.g., the first housing 501 in FIG. 25) may rotate with respect to the second housing (e.g., the second housing 503 in FIG. 25) so that the electronic device (e.g., the electronic device 500 in FIG. 25) enters a fifth disposition mode in which the first and second displays are exposed and form the exterior of the electronic device.

Figure 28:
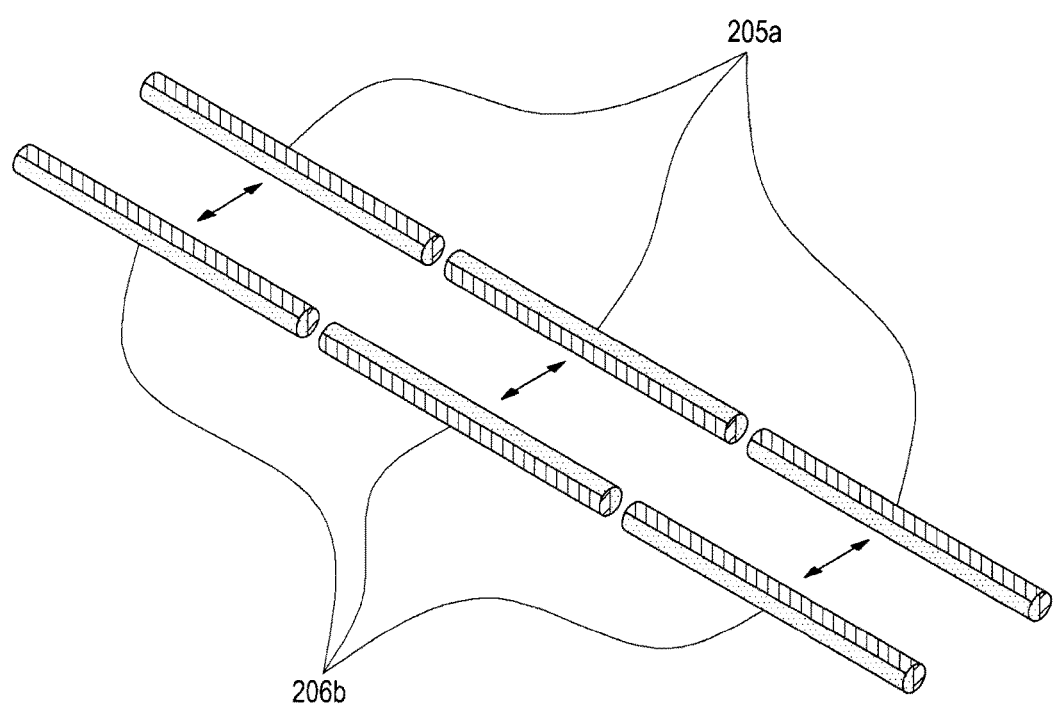
FIG. 28 is a perspective view illustrating first and second magnetic members included in an electronic device according to one of the various embodiments.

FIG. 28 is a perspective view illustrating first and second magnetic members included in an electronic device according to one of the various embodiments.

Referring to FIG. 28, the first magnetic member 205a may be configured as a combination of an odd number of magnetic members, for example, three members. The second magnetic member 206b may be configured as a combination of an odd number of magnetic members. The first pole of the first magnetic member 205a faces the third pole of the second magnetic member 206a, thereby generating magnetic force between the first magnetic member 205a and the second magnetic member 206a.

While the present disclosure has been shown and described with reference to certain embodiments thereof, it will be understood by those skilled in the art that various changes in form and details may be made therein without departing from the spirit and scope of the present disclosure as defined by the appended claims.

What is claimed is:

1. An electronic device comprising:
a first housing comprising a first lateral side;
a second housing comprising a second lateral side facing the first lateral side;
at least one first magnetic member configured to be rotatably disposed inside the first housing and adjacent to the first lateral side; and
at least one second magnetic member configured to be rotatably disposed inside the second housing, configured to rotate corresponding to a rotation of the first magnetic member, and adjacent to the second lateral side,
wherein the first housing and the second housing are rotatably coupled to each other by a magnetic force between the at least one first magnetic member and the at least one second magnetic member.

2. The electronic device of claim 1, wherein the first housing further comprises a first receptacle configured to receive the at least one first magnetic member, and
wherein the second housing further comprises a second receptacle configured to receive the at least one second magnetic member.

3. The electronic device of claim 2, wherein the first receptacle comprises a first hollow corresponding to the at least one first magnetic member, and
wherein the second receptacle comprises a second hollow corresponding to the at least one second magnetic member.

4. The electronic device of claim 3, further comprising:
a first stopper configured to be disposed inside the first housing so as to restrict rotation of the at least one first magnetic member; and
a second stopper configured to be disposed inside the second housing so as to restrict rotation of the at least one second magnetic member.

5. The electronic device of claim 4, wherein the second stopper is configured to allow rotation of the at least one second magnetic member so that the at least one second magnetic member generates the magnetic force with the at least one first magnetic member when the first housing rotates with respect to the second housing, and
wherein the first stopper is configured to be locked with the at least one first magnetic member, thereby maintaining an angle between the first housing and the second housing.

6. The electronic device of claim 4, wherein, when the first housing rotates, the first stopper is configured to allow rotation of the at least one first magnetic member so that the least one first magnetic member generates the magnetic force with the at least one second magnetic member.

7. The electronic device of claim 4, wherein the at least one first magnetic member is configured as a first cylinder and the at least one second magnetic member is configured as a second cylinder.

8. The electronic device of claim 7, wherein the at least one first magnetic member comprises:
a first pole formed on one half of an outer circumferential surface of the first cylinder along a longitudinal direction thereof; and
a second pole formed on an other half of the outer circumferential surface of the first cylinder.

9. The electronic device of claim 8, wherein the at least one second magnetic member comprises:
a third pole formed on one half of an outer circumferential surface of the second cylinder along a longitudinal direction thereof; and
a fourth pole formed on an other half of the outer circumferential surface of the second cylinder.

10. The electronic device of claim 9, wherein the at least one first magnetic member and/or the at least one second magnetic member comprise an odd number of magnetic members.

11. The electronic device of claim 4, wherein a plurality of first gear teeth are formed on the at least one first magnetic member,
wherein a plurality of second gear teeth are formed on the at least one second magnetic member,
wherein the first stopper is inserted between the plurality of first gear teeth so as to restrict rotation of the at least one first magnetic member, and
wherein the second stopper is inserted between the plurality of second gear teeth so as to restrict rotation of the at least one second magnetic member.

12. The electronic device of claim 11, wherein the first stopper comprises:
a first locking member configured to be inserted between the plurality of first gear teeth of the at least one first magnetic member; and
a first elastic member configured to provide elastic force to the first locking member, and wherein the second stopper comprises:
a second locking member configured to be inserted between the plurality of second gear teeth of the at least one first magnetic member; and
a second elastic member configured to provide elastic force to the second locking member.

13. The electronic device of claim 11, wherein, the first stopper restricts rotation of the at least one first magnetic member, the at least one first magnetic member is fixed to the first housing and is rotated along with the first housing with respect to the second housing.

14. The electronic device of claim 1, wherein the first housing rotates with respect to the second housing so as to form an angle of 0 degrees between the first housing and the second housing such that a first display disposed in the first housing faces a second display disposed in the second housing,
wherein the first housing rotates with respect to the second housing so as to form an angle of more than 0 degrees and less than 180 degrees between the first housing and the second housing while the first housing or the second housing is placed on surface,
wherein the first housing rotates with respect to the second housing so as to form an angle of 180 degrees between the first housing and the second housing,
wherein the first housing rotates with respect to the second housing so as to form an angle of more than 180 degrees and less than 360 degrees between the first housing and the second housing such that the first and second displays are disposed on an exterior of the electronic device, and
wherein the first housing rotates with respect to the second housing so as to form an angle of 360 degrees between the first housing and the second housing so that a size of the electronic device is minimized while the first and second displays are disposed on an exterior of the electronic device.

15. An electronic device comprising:
a first housing comprising a first surface, a second surface, a first lateral side surface enclosing a space between the first surface and the second surface, a first display and a first receptacle adjacent to the first lateral side;
a second housing comprising a third surface, a fourth surface, a second lateral side surface enclosing a space between the third surface and the fourth surface, a second display and a second receptacle adjacent to the second lateral side;
at least one first magnetic member configured to be rotatably received in the first receptacle;
at least one second magnetic member configured to be rotatably received in the second receptacle, and configured to rotate corresponding to a rotation of the first magnetic member;
a plurality of first inclined surfaces formed on the first lateral side; and
a plurality of second inclined surfaces formed on the second lateral side,
wherein the first magnetic member and the second magnetic member rotate with respect to each other to generate a magnetic force therebetween when the second housing is rotated with respect to the first housing, and
wherein one of the plurality of first inclined surfaces is maintained in contact with one of the plurality of second inclined surfaces by the magnetic force between the first and second magnetic members, thereby maintaining an angle between the first housing and the second housing.

16. The electronic device of claim 15, wherein the plurality of first inclined surfaces comprise:
a first contact portion configured to be inclined with respect to the first surface;
a second contact portion configured to be inclined with respect to the first contact portion; and
a third contact portion configured to be inclined with respect to the second contact portion, and
wherein the plurality of second inclined surfaces comprise:
a fourth contact portion configured to be inclined with respect to the second surface;
a fifth contact portion configured to be inclined with respect to the fourth contact portion; and
a sixth contact portion configured to be inclined with respect to the fifth contact portion.

17. The electronic device of claim 16, wherein a first angle between the first contact portion and the second contact portion is the same as a third angle between the fourth contact portion and the fifth contact portion, and
wherein a second angle between the second contact portion and the third contact portion is the same as a fourth angle between the fifth contact portion and the sixth contact portion.

18. The electronic device of claim 17, wherein the first and third angles are smaller than the second and fourth angles, respectively.

19. The electronic device of claim 16, wherein the first housing rotates with respect to the second housing such that the electronic device is in a first disposition mode in which the first display and the second display face each other,
- wherein the first housing rotates with respect to the second housing such that the electronic device is in a second disposition mode in which the first contact portion is in contact with the fourth contact portion,
- wherein the first housing rotates with respect to the second housing such that the electronic device is in a third disposition mode in which the second contact portion is in contact with the fifth contact portion,
- wherein the first housing rotates with respect to the second housing such that the electronic device is in a fourth disposition mode in which the third contact portion is in contact with the sixth contact portion, and
- wherein the first housing rotates with respect to the second housing such that the electronic device is in a fifth disposition mode in which the first and second displays are disposed on an exterior of the electronic device.

20. An electronic device comprising:
- a first housing comprising a first side;
- a second housing comprising a second side facing the first side;
- at least one first magnetic member configured to be rotatably disposed inside the first housing and adjacent to the first side;
- at least one second magnetic member configured to be rotatably disposed inside the second housing and adjacent to the second side;
- a first stopper configured to be disposed inside the first housing so as to restrict rotation of the at least one first magnetic member; and
- a second stopper configured to be disposed inside the second housing so as to restrict rotation of the at least one second magnetic member,
- wherein the first housing and the second housing are rotatably coupled to each other by a magnetic force between the at least one first magnetic member and the at least one second magnetic member,
- wherein the first housing further comprises a first receptacle configured to receive the at least one first magnetic member, and the second housing further comprises a second receptacle configured to receive the at least one second magnetic member, and
- wherein the first receptacle comprises a first hollow corresponding to the at least one first magnetic member, and the second receptacle comprises a second hollow corresponding to the at least one second magnetic member.

* * * * *